(12) United States Patent
Ifseisi et al.

(10) Patent No.: US 12,181,450 B1
(45) Date of Patent: Dec. 31, 2024

(54) METHOD OF METERED SWITCHING FOR A HIGH-PERFORMANCE LIQUID CHROMATOGRAPHY SAMPLE INJECTOR

(71) Applicant: KING SAUD UNIVERSITY, Riyadh (SA)

(72) Inventors: Ahmad Aqel Ifseisi, Riyadh (SA); Mohamed Ali Ouladsmane, Riyadh (SA); Ahmed Yacine Badjah Hadj Ahmed, Riyadh (SA); Zeid Abdullah Alothman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/581,221

(22) Filed: Feb. 19, 2024

(51) Int. Cl.
  *G01N 30/22* (2006.01)
  *G01N 30/02* (2006.01)

(52) U.S. Cl.
  CPC ....... *G01N 30/22* (2013.01); *G01N 2030/027* (2013.01)

(58) Field of Classification Search
  CPC .............. G01N 30/22; G01N 2030/027
  See application file for complete search history.

(56) References Cited

U.S. PATENT DOCUMENTS

| 4,617,828 A * | 10/1986 | Ellebracht .............. G01N 30/00 73/866 |
| 2021/0349062 A1 | 11/2021 | Shagawa et al. |
| 2023/0160381 A1 | 5/2023 | Hollnagel et al. |

FOREIGN PATENT DOCUMENTS

GB    2487941 A  *  8/2012  ............. B01D 15/14

\* cited by examiner

*Primary Examiner* — Tarun Sinha
(74) *Attorney, Agent, or Firm* — Nath, Goldberg & Meyer; Joshua B. Goldberg

(57) ABSTRACT

The method of metered switching for a high-performance liquid chromatography (HPLC) sample injector is a method of controlled switching for a HPLC sample injector to control the amount of the sample being transferred to the HPLC separation column. In a load mode of the HPLC sample injector, a sample to be tested is injected therein until a sample loop is filled. The HPLC sample injector is switched into an injection mode such that a pressurized mobile phase pushes the sample through the sample loop and out of an outlet port. The HPLC sample injector is then switched back into the load mode at a selected time corresponding to a desired volume of the sample to be dispensed from the outlet port. The time-dependent correspondence between a flow rate of the pressurized mobile phase and the desired volume of the sample for the sample loop is already known.

2 Claims, 18 Drawing Sheets

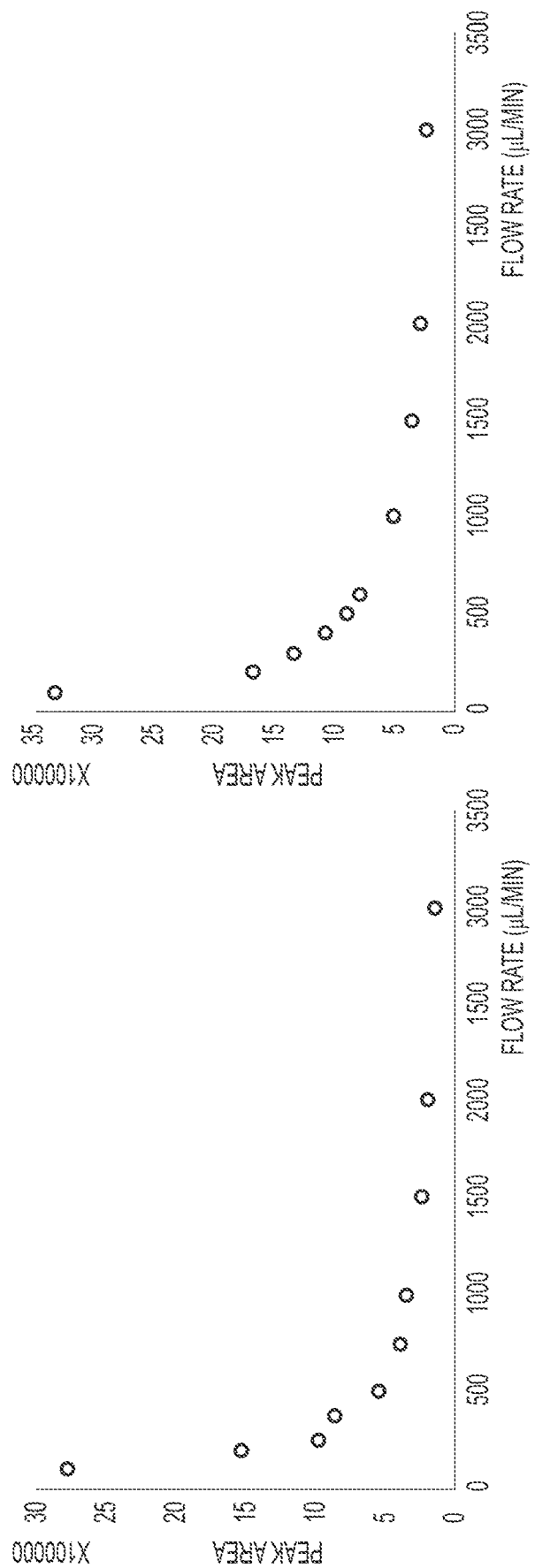

METHOD OF METERED SWITCHING FOR A HIGH-PERFORMANCE LIQUID CHROMATOGRAPHY SAMPLE INJECTOR

BACKGROUND

Field

The disclosure of the present patent application relates to high-performance liquid chromatography (HPLC), and particularly to a method of controlled switching for a HPLC sample injector to control the amount of the sample being transferred to the HPLC separation column.

Description of Related Art

High-performance liquid chromatography (HPLC) is a technique used in analytical chemistry to separate, identify and quantify each component in a mixture. HPLC relies on pumps to pass a pressurized liquid solvent containing the sample mixture through a column filled with a solid adsorbent material. Each component in the sample interacts slightly differently with the adsorbent material, causing different flow rates for the different components and leading to the separation of the components as they flow out of the column.

Chromatography in general is a mass transfer process involving adsorption. HPLC, in particular, relies on pumps to pass the pressurized liquid and the sample mixture through the column filled with the adsorbent, leading to the separation of the sample components. The active component of the column (i.e., the adsorbent) is typically a granular material made of solid particles (e.g., silica, polymers, etc.), generally with a particle size of about 2 µm to 50 µm. The components of the sample mixture are separated from each other due to their different degrees of interaction with the adsorbent particles. The pressurized liquid is typically a mixture of solvents (e.g., water, acetonitrile and/or methanol) and is referred to as the "mobile phase." The composition and temperature of the mobile phase play a major role in the separation process by influencing the interactions taking place between the sample components and the adsorbent. These interactions are physical in nature, such as hydrophobic (dispersive) interactions, dipole-dipole interactions, ionic interactions, and combinations thereof.

HPLC is distinguished from traditional liquid chromatography by the significantly higher operational pressures (50-350 bar), whereas traditional liquid chromatography relies on the force of gravity to pass the mobile phase through the column. Due to the small sample amount separated in analytical HPLC, typical column dimensions are approximately 2.1-4.6 mm in diameter, and approximately 30-250 mm in length.

FIG. 2 illustrates a typical HPLC system 100. Solvent flow through HPLC system 100 begins in solvent reservoirs 102, 104, which contain the solvents used to carry the sample through the system. The solvents are typically filtered through an inlet solvent filter to remove any particles that could potentially damage the system's sensitive components. The filter may be incorporated into, or work in conjunction with, a solvent degasser 106. HPLC systems typically use a high-pressure gradient pump. Although shown in FIG. 2 as a gradient valve 108 and a separate high-pressure pump 112 (communicating with one another through mixing vessel 110 for the delivery of the mobile phase), high-pressure gradient pumps including these components in a single unit are also commonly used. The gradient valve 108 allows for mixing of multiple solvents together (such as those from separate solvent reservoirs 102, 104) in ratios changing in time, thus generating a composition gradient in the mobile phase.

The high-pressure gradient pump propels the solvents through the system after the solvents are degassed in solvent degasser 106. Mechanical action within the high-pressure pump 112 can create some particulate material in the fluid stream, so an inline solvent filter is commonly used to prevent any post-pump component plugging or damage. Solvent degassing prevents the formation of bubbles when the mobile phase components are mixed in the mixing vessel 110. Bubble prevention is important because bubbles in a flow cell or mass spectrometer source, for example, can interfere with the detection of sample components. Alternatively, an inert gas sparging system is sometimes installed to force dissolved gasses out of the solvents stored in the solvent reservoirs 102, 104.

The mixed solvents are pumped to the sample injector 114 (also commonly referred to as a "switching valve", "injection valve", or "sampler"). The sample injector 114 is a valve equipped with a sample loop 116 of the appropriate size for the analysis being performed. The sample injector 114 reproducibly injects plugs of sample into the flow path. Because the sample often contains particulate matter, a precolumn filter 118 may be used to prevent valve and column damage. The sample injector 114 brings the sample mixture into the mobile phase stream, which carries the sample mixture into the column 120, with the high-pressure pump 112 delivering the desired flow and composition of the mobile phase through the column 120. The sample injector 114 is connected between the high-pressure pump and the separation column 120 via the sample loop 116. The sample is injected into the sample injector 114 through an injection port and, traditionally, the quantity of the injected sample is governed by the capacity of the sample loop 116. Standard sample injectors, such as sample injector 114 of FIG. 2, include six outlet ports and are designed with the ability to rotate 30° clockwise and counterclockwise between respective "load" and "inject" modes. This design allows the samples to charge into the sample loop 116 and be delivered into the column 120 through the mobile phase elution.

Following the injection of the sample, the analytical column 120 separates the sample plug into its various components. This is based on the differential attraction of the sample components for the solvent and the packing material within the column. The precolumn filter 118 may include, or be used in conjunction with, a sacrificial guard column, which chemically removes components of the sample that could foul the separation column, hinder the separation, or interfere with other downstream processes.

Following the analytical column 120, the separated components pass through a detector 122 before they pass into the waste reservoir 124. Common detector types include, but are not limited to, optical absorbance detectors, fluorescence detectors, UV/Vis spectrometers, photodiode arrays, and mass spectrometers. Sometimes a combination of different detector types is used. The detector 122 generates a signal proportional to the amount of sample component emerging from the column 120, thus allowing for quantitative analysis of the sample components. A data acquisition and analysis system 126 is in communication with the detector 122 for providing analysis of the data acquired by detector 122. The data acquisition and analysis system 126 may include, for example, a digital microprocessor, a computer, a programmable logic controller or the like, along with user software for controlling the HPLC process and providing data analysis.

FIGS. 3A and 3B illustrate an example of a typical sample injector 114 in use. In FIG. 3A, sample injector 114 is in the "load" mode. In the load mode, injection port 128 is open for receiving the sample to be tested. The sample is typically injected into injection port 128 using a manual syringe, a small pump or the like. Conventional tubing or the like connects injection port 128 with a first loop port 130 so that the injected sample can be transferred into sample loop 116. The sample is injected into sample loop 116 until sample loop 116 is completely filled. Sample loop 116 terminates at second loop port 136. The second loop port 136 is connected to a waste port 138 by conventional tubing or the like so that excess sample can be drained off. In the load mode of FIG. 3A, mobile phase port 132, which receives the mobile phase via the high-pressure pump 112 of FIG. 2, is only connected to outlet port 134 (through conventional tubing or the like), which outputs the mobile phase to the separation column 120 of FIG. 2.

Once the sample tube 116 is filled, the switch 140 is rotated such that sample injector 114 is in the "injection" mode of FIG. 3B. In the injection mode, the mobile phase port 132 now connects to the second loop port 136. Under the power of high-pressure pump 112, the mobile phase is pushed through the sample loop 116. In the example of FIG. 3B, point P represents a division point between the mobile phase and the sample. Shortly after switching into the injection mode, the mobile phase flows into sample loop 116, which is already filled with the sample to be tested, and pushes the sample toward the first loop port 130. In the diagrammatic illustration of FIG. 3B, shortly after switching into the injection mode, the portion of the sample loop 116 to the left of point P is substantially full of the mobile phase (with some mixing with the sample), and the portion of the sample loop 116 to the right of point P is substantially full of the sample to be tested (with some mixing with the mobile phase). The mobile phase pushes the sample to the first loop port 130, where it is transferred to the outlet port 134 (through conventional tubing or the like). From outlet port 134, the sample is then transferred to the separation column 120 for separation.

Typically, the sample injector 114 remains in the injection mode until all of the sample has been replaced with the mobile phase. Since the process is typically performed manually, the quantity of the sample being tested can only be estimated based on a best estimate of the volume of the sample loop 116. Although numerous types of analysis merely require a minimal volume of a sample for testing, without knowing the actual volume, the expansion of HPLC to an even wider range of applications is difficult without a technique for accurately measuring the volume of the sample being tested. Thus, a method of metered switching for a high-performance liquid chromatography sample injector solving the aforementioned problems is desired.

SUMMARY

The method of metered switching for a high-performance liquid chromatography (HPLC) sample injector is a method of controlled switching for a HPLC sample injector to control the amount of the sample being transferred to the HPLC separation column. In a load mode of the HPLC sample injector, a sample to be tested is injected into the HPLC sample injector until a sample loop thereof is filled with the sample. In the load mode, the sample loop is not in fluid communication with an outlet port of the high-performance liquid chromatography sample injector. The HPLC sample injector is switched into an injection mode in which the sample loop is in fluid communication with a source of pressurized mobile phase and with the outlet port such that the pressurized mobile phase pushes the sample through the sample loop and out of the outlet port to the HPLC separation column. The HPLC sample injector is then switched back into the load mode at a selected time corresponding to a desired volume of the sample to be dispensed from the outlet port. The time-dependent correspondence between a flow rate of the pressurized mobile phase and the desired volume of the sample for the sample loop is already known such that, for any desired volume of the sample to be tested, the corresponding switching time is already known.

These and other features of the present subject matter will become readily apparent upon further review of the following specification.

BRIEF DESCRIPTION OF DRAWINGS

FIG. 5A is a plot of peak area as a function of mobile phase flow rate for HPLC performed on the sample of 0.015% acetone in water (v/v) using the gray PEEK tubing as the sample loop.

FIG. 5B is a plot of peak area as a function of mobile phase flow rate for HPLC performed on the sample of 0.015% acetone in water (v/v) using green PEEK tubing as the sample loop.

Similar reference characters denote corresponding features consistently throughout the attached drawings.

DETAILED DESCRIPTION

Figure 2:
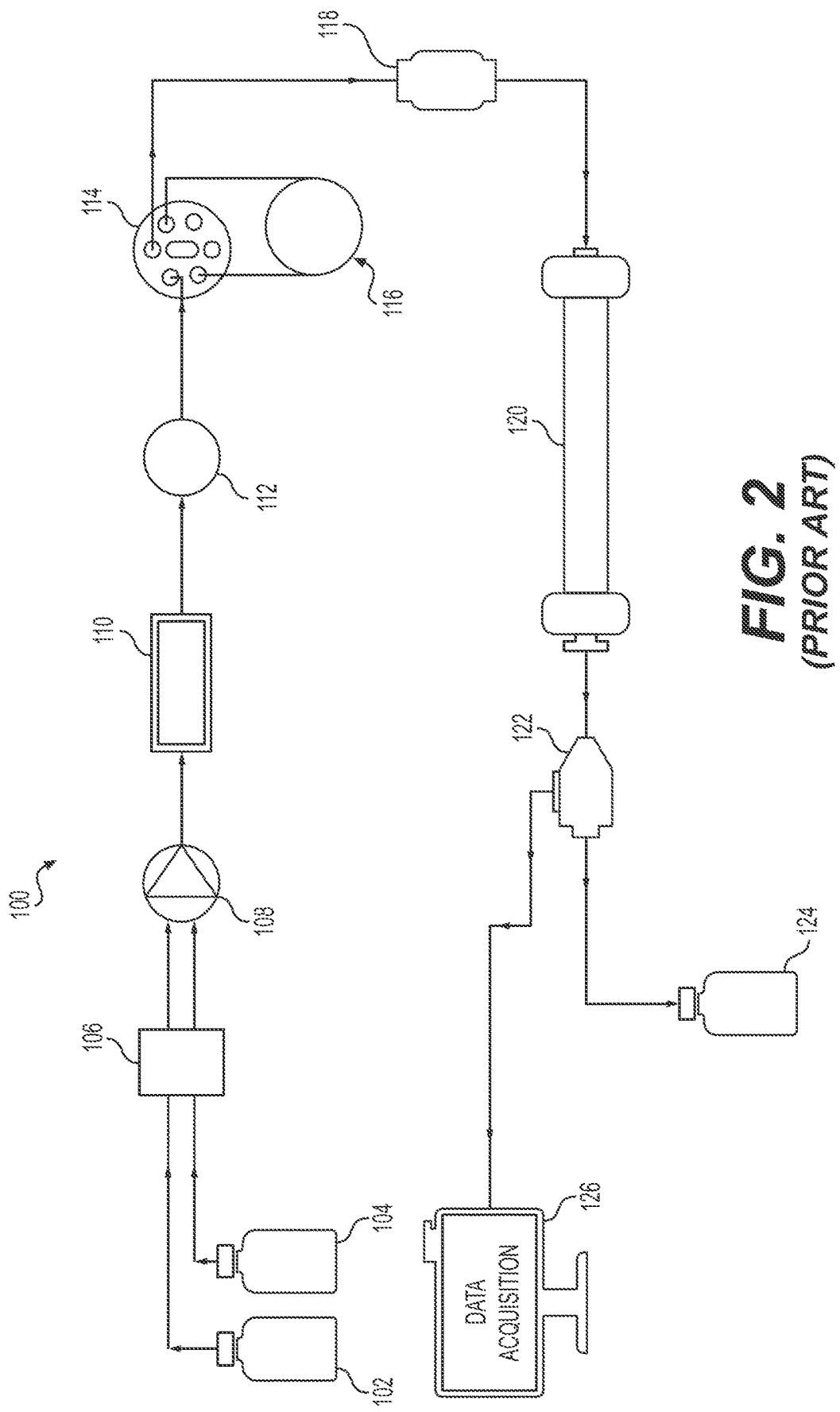
FIG. 2 diagrammatically illustrates a conventional high-performance liquid chromatography (HPLC) system.
Figure 3A:
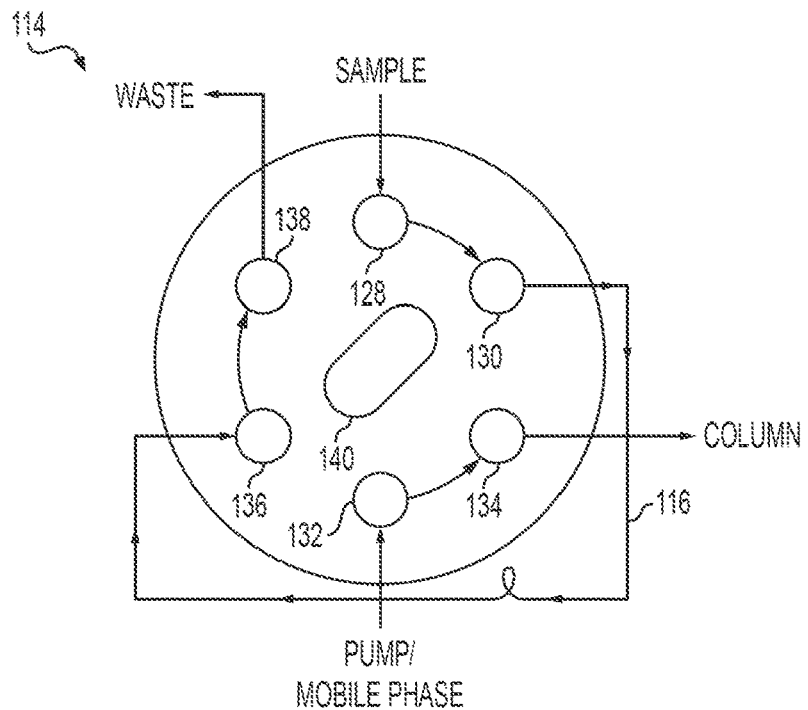
FIG. 3A diagrammatically illustrates operation of a conventional HPLC sample injector in a load mode.
Figure 3B:
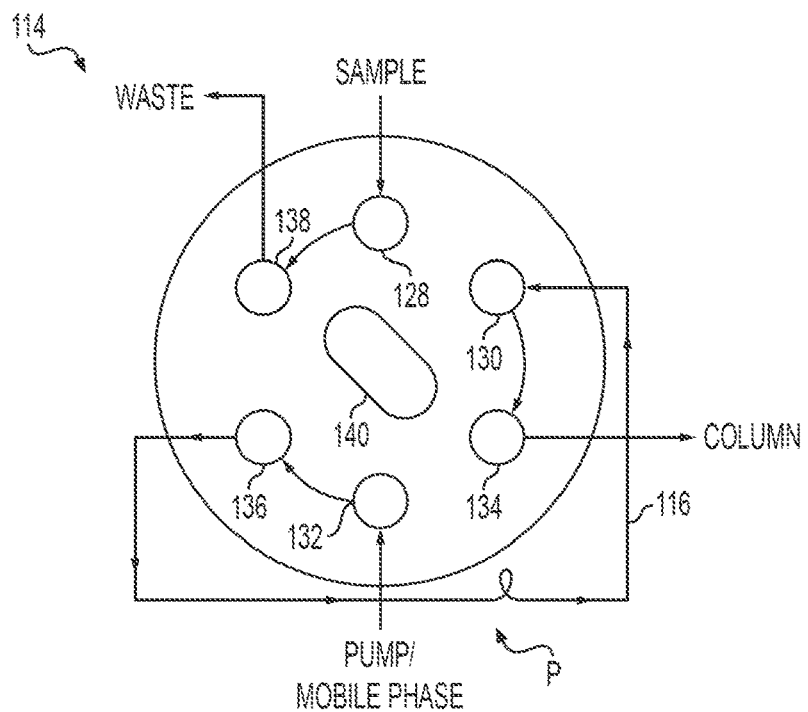
FIG. 3B diagrammatically illustrates operation of the conventional HPLC sample injector in an injection mode.

The method of metered switching for a high-performance liquid chromatography (HPLC) sample injector is a method of controlled switching for a HPLC sample injector to control the amount of the sample being transferred to the HPLC separation column. It should be understood that the method may be used with any conventional HPLC sample injector, such as, for example, sample injector 114 illustrated in FIGS. 2, 3A and 3B. Using sample injector 114 as a non-limiting example, in the "load" mode of HPLC sample injector 114, the sample to be tested is injected into the HPLC sample injector 114 until the sample loop 116 is filled with the sample. In the load mode, injection port 128 is open for receiving the sample to be tested, and the sample may be injected into injection port 128 using a manual syringe, a small pump or the like. Conventional tubing or the like connects injection port 128 with the first loop port 130 so that the injected sample can be transferred into sample loop 116. The sample is injected into sample loop 116 until sample loop 116 is completely filled. Sample loop 116 terminates at second loop port 136. The second loop port 136 is connected to the waste port 138 by conventional tubing or the like so that excess sample can be drained off. This ensures that the sample loop 116 is fully filled with the sample to be tested. In the load mode, the sample loop 116 is not in fluid communication with the outlet port 134 of sample injector 114 (which delivers the sample and the mobile phase to the separation column 120 of FIG. 2).

The HPLC sample injector 114 is next switched into an "injection mode" in which the sample loop 116 is in fluid communication with the source of pressurized mobile phase and with the outlet port 134, such that the pressurized mobile phase pushes the sample through the sample loop 116 and out of the outlet port 134 to the HPLC separation column 120. As a non-limiting example, the power of high-pressure pump 112 of FIG. 2 may drive the pressurized mobile phase into the HPLC sample injector 114 through mobile phase port 132. The pressurized mobile phase then pushes the sample through the sample loop 116, which was filled with the sample in the load mode, and out the outlet port 134. In the non-limiting example of FIGS. 3A and 3B, a conventional rotatable switch 140 is shown for switching between the load and injection modes through appropriate opening and closing of the internal valves associated with each port, as is conventionally known. In the injection mode, the mobile phase port 132 connects to the second loop port 136. The mobile phase pushes the sample to the first loop port 130, where it is transferred to the outlet port 134 (through conventional tubing or the like). From outlet port 134, the sample is then transferred to the separation column 120 for separation.

The HPLC sample injector 114 is then switched back into the load mode at a selected time corresponding to a desired volume of the sample to be dispensed from the outlet port 134. The time-dependent correspondence between a flow rate of the pressurized mobile phase and the desired volume of the sample for the sample loop 116 is already known such that, for any desired volume of the sample to be tested, the corresponding switching time is already known. In conventional usage, the flow rate of the mobile phase will typically be between approximately 0.50 μL/min and approximately 1.0 mL/min. The time in which sample injector 114 will remain in injection mode before being switched back into load mode will typically be between approximately 1.0 seconds and 120.0 seconds. In order to provide the user with versatile options for selecting volumes of the sample to be tested, it should be understood that multiple sample loops with differing internal volumes may be provided. For a given flow rate, $R_f$, the volume of sample dispensed, V, may be estimated by the general linear relationship of $V=R_f t$, where t is the time in which the HPLC sample injector 114 remains in the injection mode. However, since numerous factors, such as temperature, relative viscosities, mixing, etc., are involved, the actual linear relationship must be calculated experimentally. In the examples discussed below, actual experiments were performed for different types of sample loops with differing types of fluids at varying flow rates, resulting in empirical data which provides the actual linear relationship, allowing the volume to be calculated as a function of time (or vice versa) for a wide variety of materials under a wide variety of operational parameters. A table of such relationships may be assembled, providing the user to meter the time of the injection mode for a desired volume of sample. It should be understood that the switching between the injection mode and the load mode may be performed manually or, alternatively, may be performed automatically; e.g., using a motor, actuator or the like under the control of a timer, timing circuit or the like.

Example 1

A fused silica capillary column (250 μm internal diameter and 20 cm long) packed with a porous polymeric stationary phase was connected to a conventional liquid chromatography system equipped with a simple feed pump (maximum pressure of 40 MPa), with a flow rate ranging from 0.0001 mL/min to 10.0000 mL/min, an ultraviolet photodiode array (PDA) detector, a standard ultraviolet detector cell (optical path length of 10 mm, and a volume of 10 μL), and a manual standard sample injector (Rheodyne® Injector Model No. 7725).

Sample loops were prepared using gray polyetheretherketone (PEEK) tubing. As is well known in the field of HPLC, the standard PEEK tubing used for HPLC sample loops is color coded according to an industry standard. The gray PEEK tubing had an internal diameter of 1.016 mm and a length of 14.7 cm, corresponding to a full internal loop volume of 119.158 μL. The sample loop was filled with a solution of acetone 0.015% in water (v/v).

The sample was injected into the sample injector using a disposable manual syringe under a mobile phase of acetonitrile/water (50:50, v/v) at a 260 nm detection wavelength. The mobile phase flow varied from 0.10 mL/min to 1.0 mL/min. Upon switching of the sample injector to the injection mode, a stopwatch was started, and the stopwatch was stopped when the sample injector was switched back to the load mode. The injected volumes were measured corresponding to the counting time; i.e., the time counted by the stopwatch. The run was repeated three times for each switching time.

Figure 1:
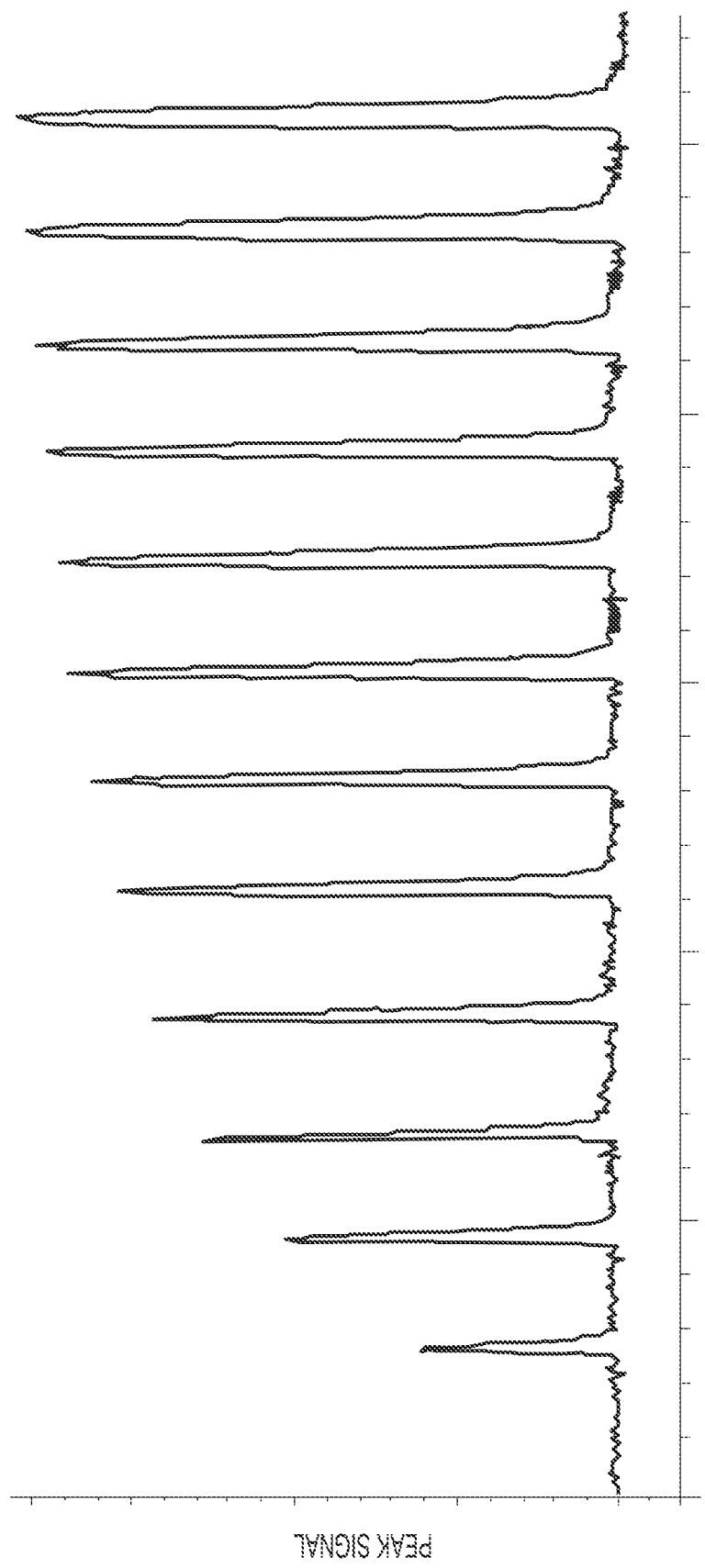
FIG. 1 is a chromatogram produced by high-performance liquid chromatography (HPLC) on a sample of 0.015% acetone in water (v/v), showing peaks as a function of time of the injection mode, using gray polyetheretherketone (PEEK) tubing as the sample loop, and with acetonitrile/water (50:50, v/v) as the mobile phase at a flow rate of 500 L/min.
Figure 4A:
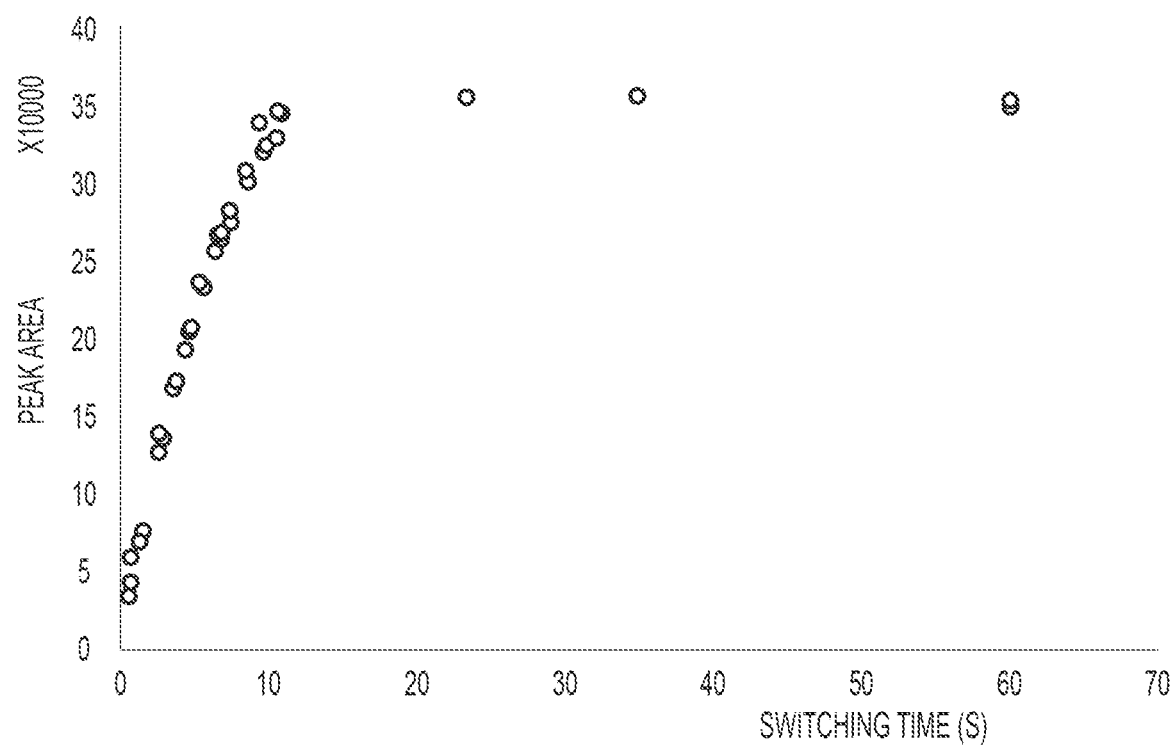
FIG. 4A is a plot of peak area for the chromatogram of FIG. 1, plotted as a function of the time of the injection mode.
Figure 4B:
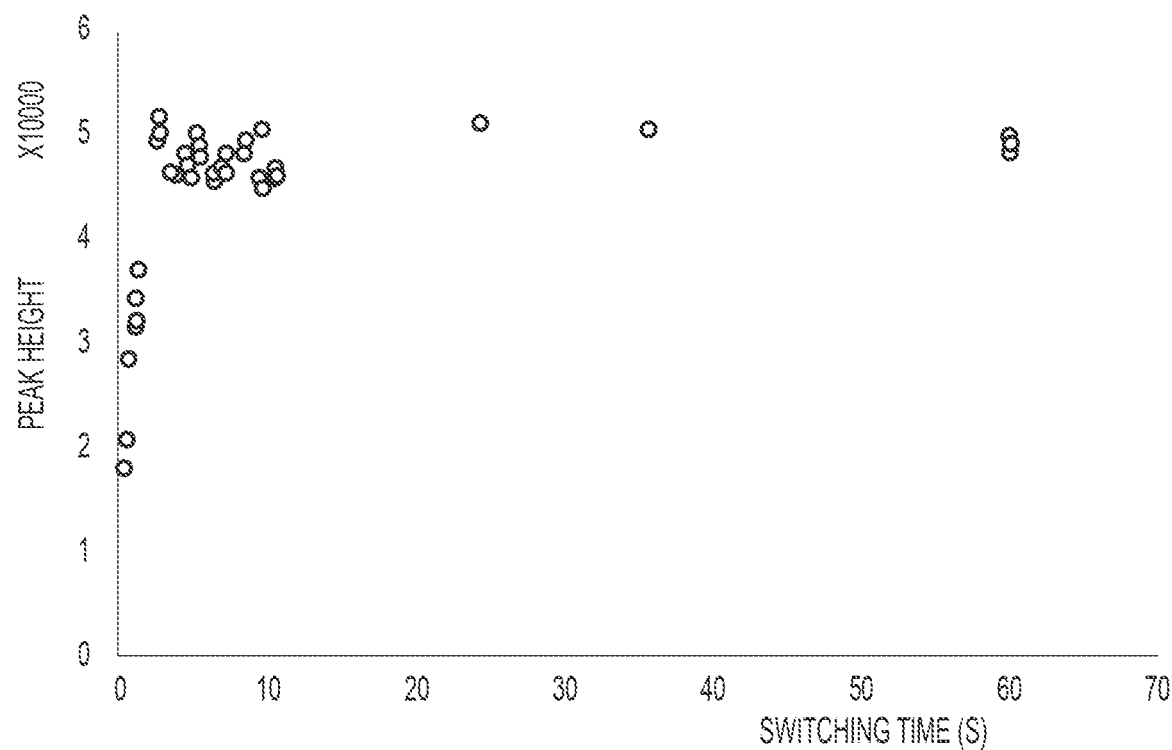
FIG. 4B is a plot of peak height for the chromatogram of FIG. 1, plotted as a function of the time of the injection mode.

FIG. 1 shows the chromatogram for the acetone sample, using the gray sample loop, at a flow rate of 500 μL/min. The chromatogram shows the increase of the peak area and the peak height as the injected volume increased corresponding to the switching time of the sample loop. This trend was confirmed by calculating the peak area and the peak height after each cycle. FIGS. 4A and 4B show the increase of the peak area and peak height, respectively, with the switching time of the sample loop. The maximum and stable peak areas and heights were obtained by leaving the sample loop open, which corresponds to the maximum and full loop injection. The maximum and stable peak areas and heights can also be obtained as the switching time reaches the limits of linearity time at each flow rate; i.e., the time at which the linear relationship between the volume dispensed and the injection time still applies. The limits of linearity time of the gray tubing corresponding to the full loop injection volume at different flow rates are given in Table 1 below. Under different conditions of mobile phase flow rates and switching time, accurate volumes were successfully injected into the separation column varying from 9.75 μL to 119.158 μL.

Figures 5C, 5D:
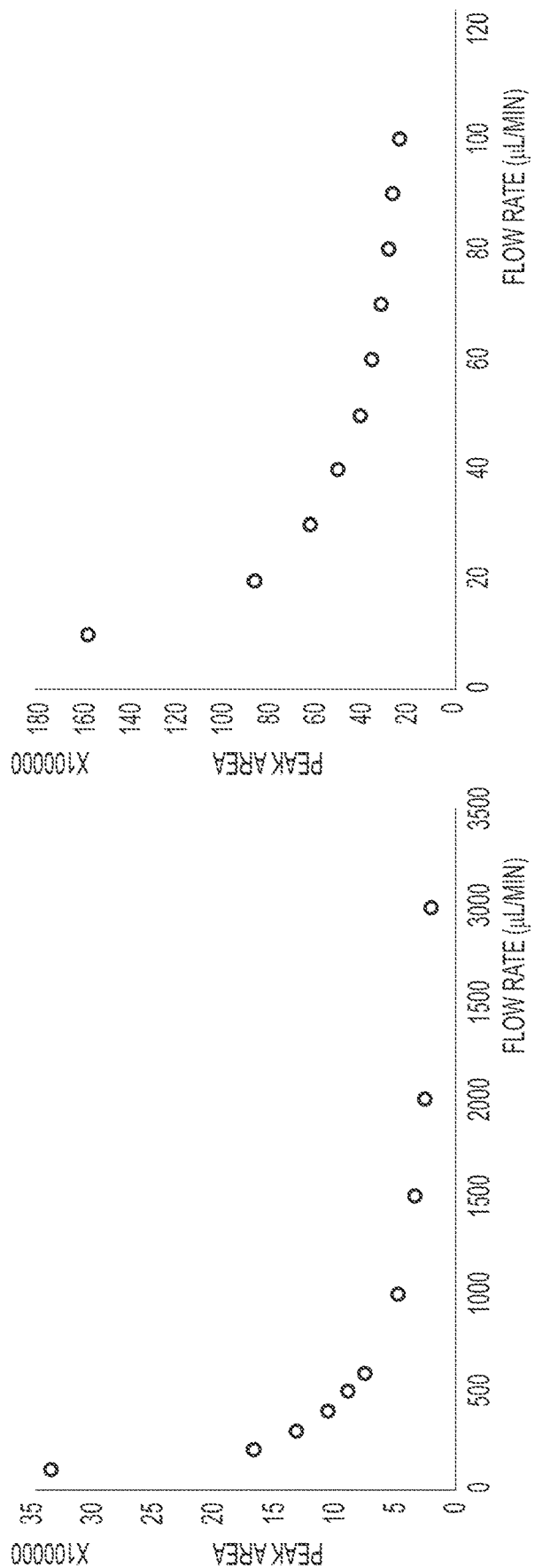
FIG. 5C is a plot of peak area as a function of mobile phase flow rate for HPLC performed on the sample of 0.015% acetone in water (v/v) using orange PEEK tubing as the sample loop.
FIG. 5D is a plot of peak area as a function of mobile phase flow rate for HPLC performed on the sample of 0.015% acetone in water (v/v) using blue PEEK tubing as the sample loop.

As the mobile phase flow rate increased, the areas of the acetone peaks gradually decreased at a fixed switching time of the sample loop, as shown in FIGS. 5A-5F. FIG. 5A shows the results for the gray tubing. FIGS. 5B-5F show the results for green, orange, blue, yellow and red tubing, respectively, whose dimensions are given below in Table 2. FIGS. 6A-6F show the linear relationship between peak area and switching time for the gray, green, orange, blue, yellow and red tubing, respectively, thus confirming the accuracy and precision of the injected volumes. The linear relationships between the switching time, and thus the injection volume, and peak area of the samples with a correlation coefficient ($R^2$) better than 0.9873 in all cases shows the accuracy and precision of the injected volumes.

TABLE 1

PEEK Tubing Types Used at Different Mobile Phase Flow Rates

| PEEK tubing | Flow rate (μL/min) | Limit of linearity time (s) | Linear equation | $R^2$ |
|---|---|---|---|---|
| Gray PEEK | 1000 | 7.34 | y = 35925x + 3094 | 0.9895 |
| | 750 | 9.49 | y = 31332x + 3594 | 0.9983 |
| | 500 | 14.51 | y = 21175x + 14029 | 0.9873 |
| | 300 | 24.53 | y = 15151x + 7002 | 0.9901 |
| Green | 600 | 5.34 | y = 87051x + 16692 | 0.9867 |

TABLE 1-continued

PEEK Tubing Types Used at Different Mobile Phase Flow Rates

| PEEK tubing | Flow rate (μL/min) | Limit of linearity time (s) | Linear equation | $R^2$ |
|---|---|---|---|---|
| PEEK | 500 | 6.47 | y = 100055x + 5085 | 0.9846 |
| | 400 | 7.36 | y = 101443x + 3891 | 0.9919 |
| | 300 | 10.43 | y = 90634x + 5755 | 0.9889 |
| | 200 | 17.51 | y = 79675x + 5482 | 0.9884 |
| Orange PEEK | 300 | 6.26 | y = 364646x + 15451 | 0.9909 |
| | 250 | 7.60 | y = 366779x + 14635 | 0.9942 |
| | 200 | 9.42 | y = 351259x + 19378 | 0.9935 |
| | 150 | 13.45 | y = 347599x + 16211 | 0.9960 |
| | 100 | 19.46 | y = 292479x + 13166 | 0.9981 |
| Blue PEEK | 50 | 8.24 | y = 220943x + 70275 | 0.9957 |
| | 45 | 9.34 | y = 185780x + 86799 | 0.9905 |
| | 40 | 10.34 | y = 135647x + 93067 | 0.9942 |
| | 30 | 13.92 | y = 237496x + 10468 | 0.9940 |
| | 20 | 19.47 | y = 207730x + 12815 | 0.9847 |
| Yellow PEEK | 30 | 6.04 | y = 367545x + 15564 | 0.9942 |
| | 25 | 7.36 | y = 360072x + 18099 | 0.9944 |
| | 20 | 9.45 | y = 372346x + 11977 | 0.9959 |
| | 15 | 12.51 | y = 339096x + 16069 | 0.9960 |
| | 10 | 18.35 | y = 356006x + 9168 | 0.9969 |
| Red PEEK | 2.0 | 30.37 | y = 253348x + 60441 | 0.9961 |
| | 1.0 | 60.52 | y = 231542x + 54872 | 0.9947 |
| | 0.5 | 120.06 | y = 210834x + 72460 | 0.9919 |
| Red PEEKsil ™ | 2.0 | 29.85 | y = 157326x + 107945 | 0.9896 |
| | 1.0 | 59.54 | y = 153467x + 95246 | 0.9928 |
| | 0.5 | 119.15 | y = 154298x + 84753 | 0.9964 |

TABLE 2

PEEK Tubing Dimensions

| PEEK color code | Inner diameter | | Volume of 1 cm PEEK length | Loop length | Loop volume |
|---|---|---|---|---|---|
| | inch | mm | (μL) | (cm) | (μL) |
| Gray PEEK | 0.040 | 1.016 | 8.106 | 14.7 | 119.158 |
| Green PEEK | 0.030 | 0.762 | 4.560 | 11.6 | 52.896 |
| Orange PEEK | 0.020 | 0.508 | 2.026 | 15.8 | 32.011 |
| Blue PEEK | 0.010 | 0.254 | 0.506 | 13.3 | 6.730 |
| Yellow PEEK | 0.007 | 0.178 | 0.249 | 11.8 | 2.938 |
| Red PEEK | 0.005 | 0.127 | 0.127 | 9.0 | 1.143 |
| Red PEEKsil ™ | 0.004 | 0.100 | 0.0785 | 12.8 | 1.005 |

Example 2

Figure 7A:
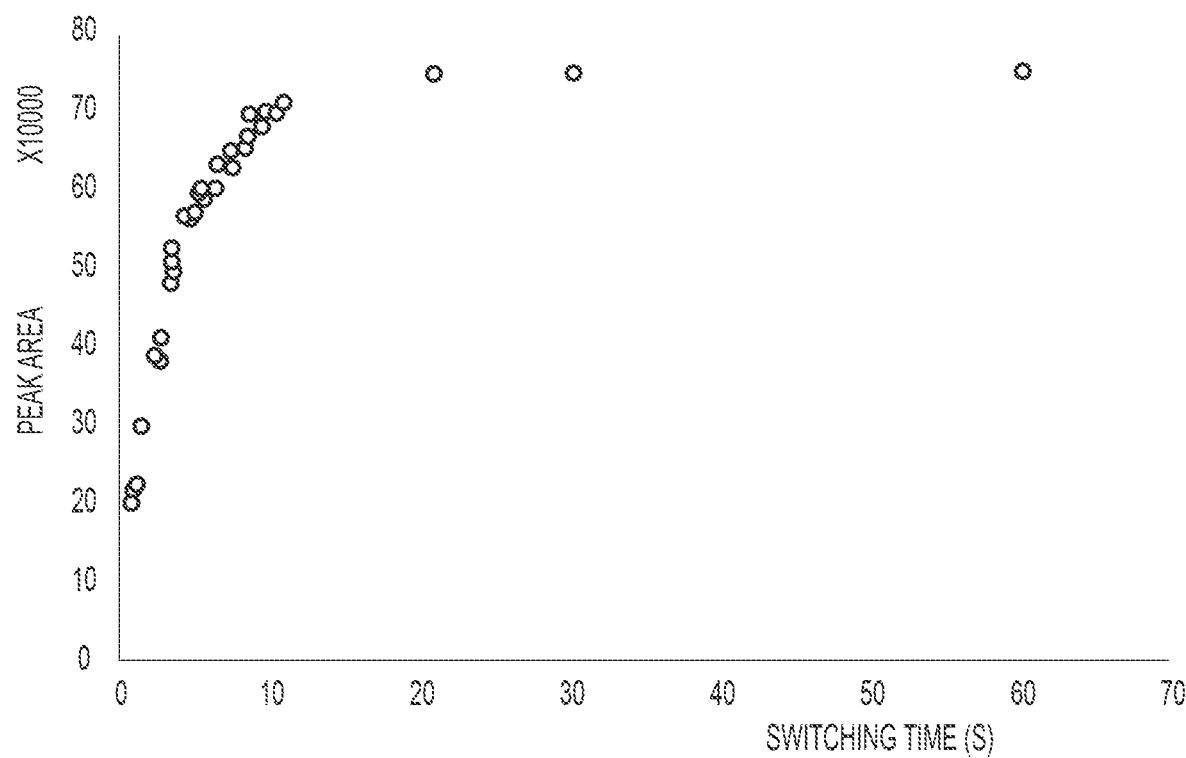
FIG. 7A is a plot of peak area for HPLC performed on the sample of 0.015% acetone in water (v/v), plotted as a function of the time of the injection mode, using the green PEEK tubing as the sample loop, and with a mobile phase flow rate of 400 µL/min.
Figure 7B:
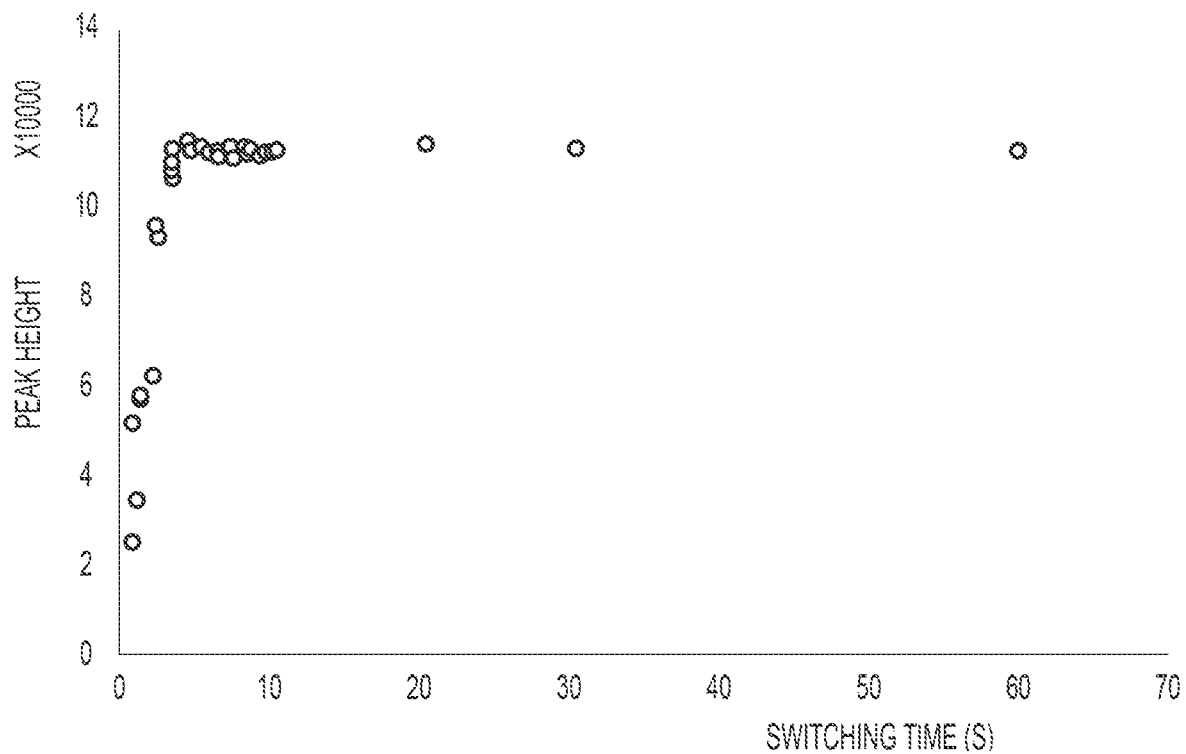
FIG. 7B is a plot of peak height for HPLC performed on the sample of 0.015% acetone in water (v/v), plotted as a function of the time of the injection mode, using the green PEEK tubing as the sample loop, and with a mobile phase flow rate of 400 µL/min.
Figure 8A:
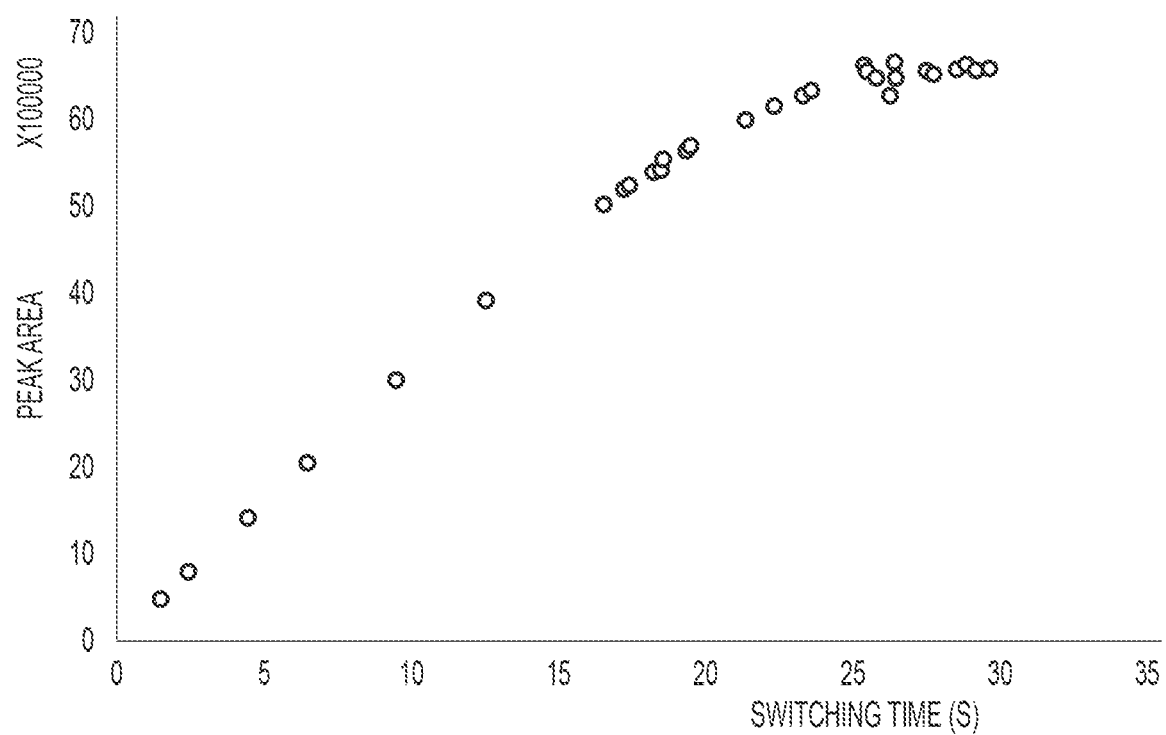
FIG. 8A is a plot of peak area for HPLC performed on the sample of 0.015% acetone in water (v/v), plotted as a function of the time of the injection mode, using the orange PEEK tubing as the sample loop, and with a mobile phase flow rate of 200 L/min.
Figure 8B:
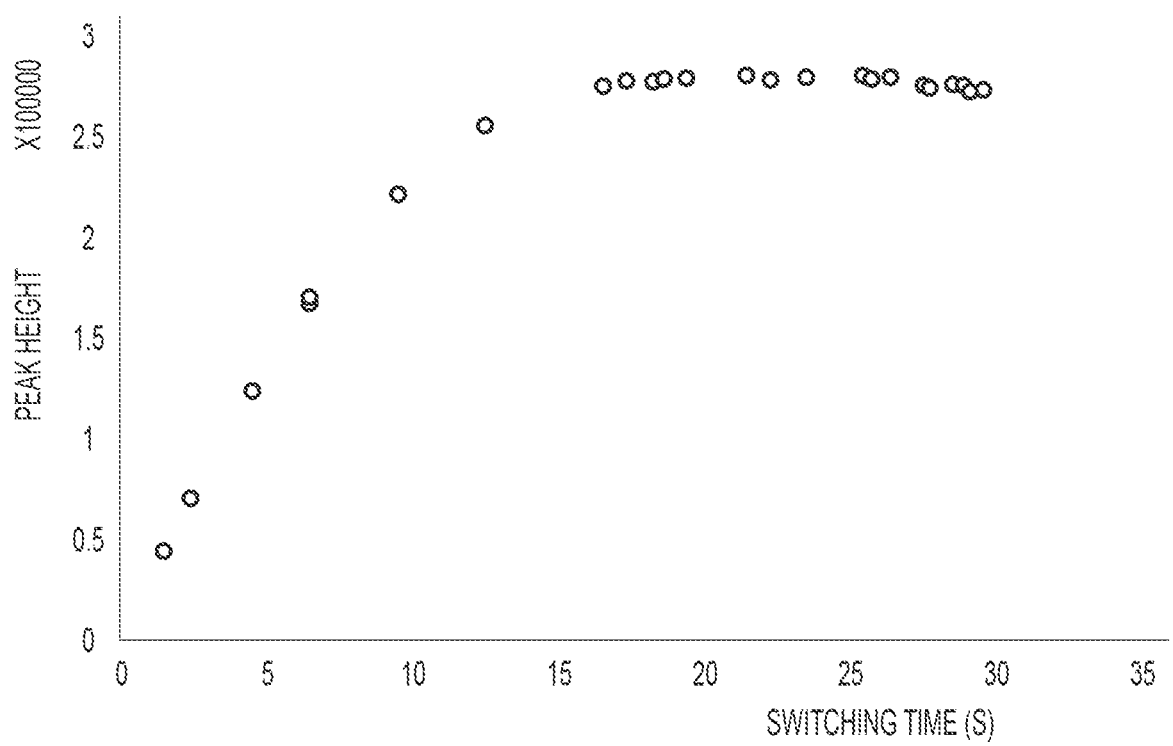
FIG. 8B is a plot of peak height for HPLC performed on the sample of 0.015% acetone in water (v/v), plotted as a function of the time of the injection mode, using the orange PEEK tubing as the sample loop, and with a mobile phase flow rate of 200 µL/min.

Using the same parameters used in Example 1, the experiments were repeated for the green PEEK sample loop (0.762 mm inner diameter, 11.6 cm long, and a 52.896 μL internal loop volume) and the orange PEEK sample loop (0.508 mm internal diameter, 15.8 cm long, and a 32.011 μL internal loop volume). FIGS. 7A and 7B show the increase of the peak area and peak height with the switching time for the green PEEK sample loop, respectively, and FIGS. 8A and 8B show the increase of the peak area and peak height with the switching time for the orange PEEK sample loop, respectively. The maximum areas and heights of the peaks were obtained by leaving the sample loop open, which corresponds to the full loop injection. The limits of linearity time of the green and orange loops at different mobile phase flow rates are summarized above in Table 1. Under different conditions of mobile phase flow rates and switching time, accurate volumes were successfully injected into the separation column varying from 7.80 μL to 52.896 μL using the green sample loop and 2.50 μL to 32.011 μL using the orange sample loop.

While the flow rate of the mobile phase increased, the areas of the peaks gradually decreased, as shown in FIGS. 5B and 5C for the green and orange sample loops, respectively. As demonstrated in FIGS. 6B and 6C, the linear relationships between the peak areas of the samples and the switching time with $R^2$ values ≥0.9846 for the green loop and ≥0.9909 for the orange loop, respectively, in all cases shows the accuracy and precision of the injected volumes.

Example 3

A fused silica capillary column with the same type of polymeric stationary phase used in Examples 1 and 2 was prepared, but with a smaller internal diameter (100 μm) and the same length (20 cm). The column was connected to the same conventional HPLC system. Detection was performed using a micro-UV detector cell with a volume of 1.60 μL. A sample loop was prepared using the blue PEEK tubing with an internal diameter of 0.254 mm and a length of 13.3 cm, resulting in a full loop volume of 6.730 μL. The sample loop was filled with a solution of acetone 0.3% in water (v/v) using a disposable manual syringe. The samples were eluted using a binary acetonitrile/water (50:50, v/v) composition at different flow rates ranging from 0.50 L/min to 50.0 μL/min. The samples were detected at a 260 nm UV wavelength.

Figure 9:
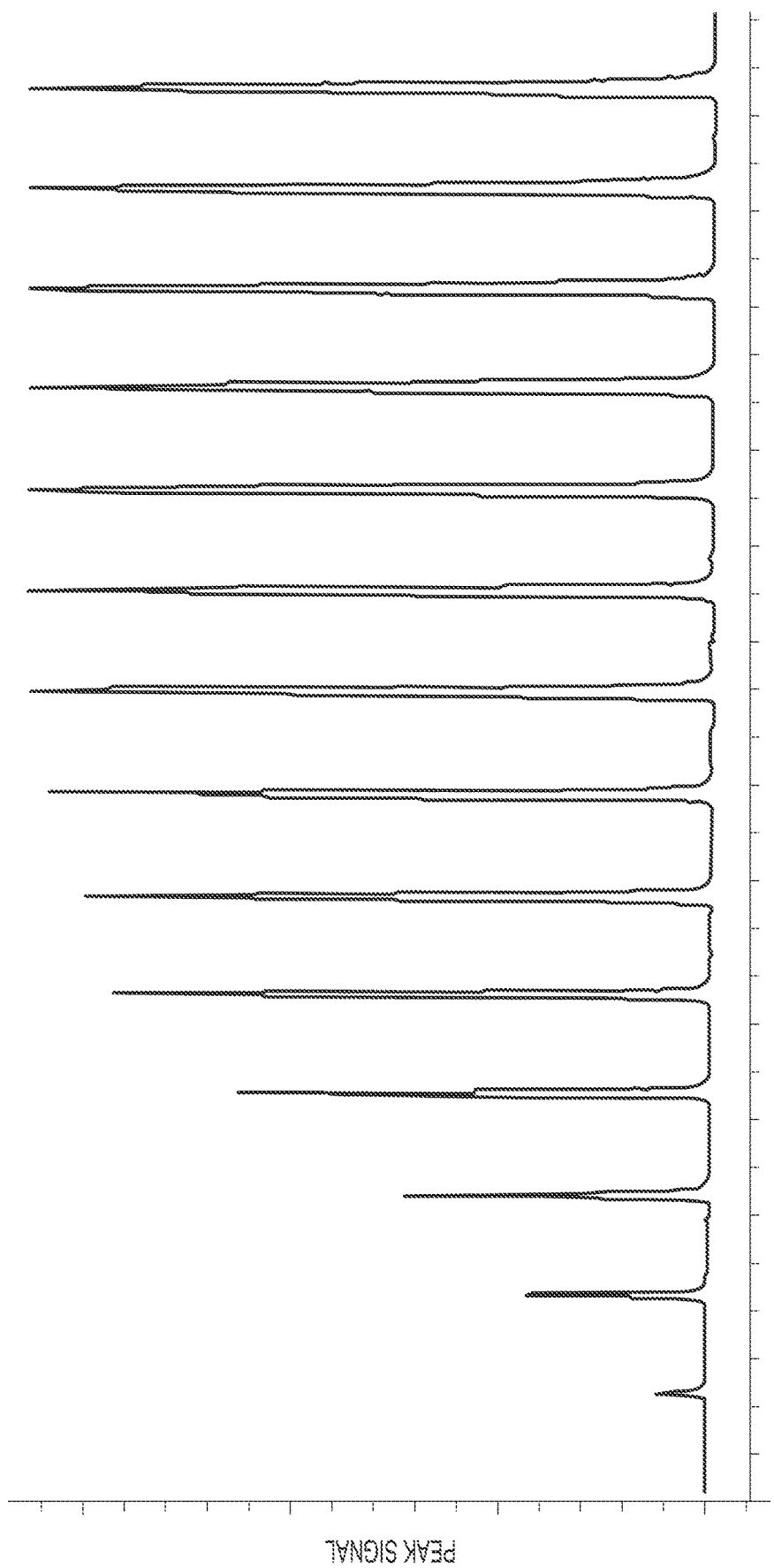
FIG. 9 is a chromatogram produced by HPLC on a sample of 0.3% acetone in water (v/v), showing peaks as a function of time of the injection mode, using the blue PEEK tubing as the sample loop, and with water as the mobile phase at a flow rate of 50 µL/min.
Figure 10A:
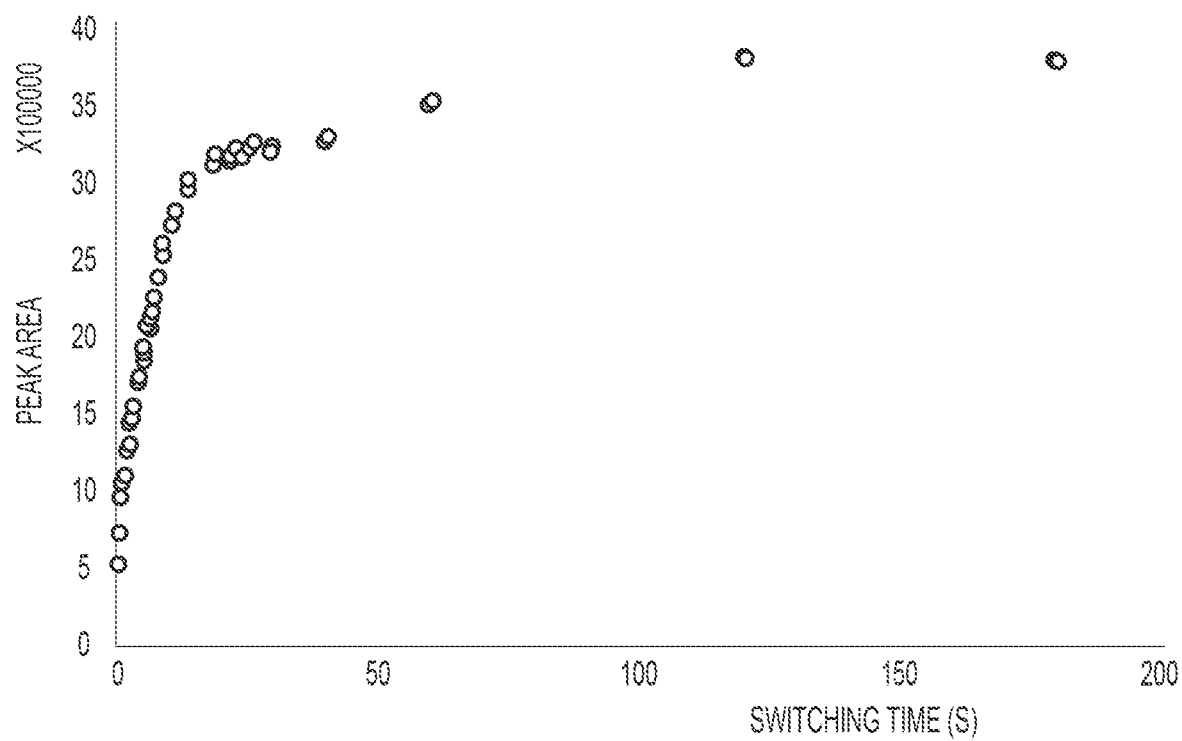
FIG. 10A is a plot of peak area for HPLC performed on the sample of 0.3% acetone in water (v/v), plotted as a function of the time of the injection mode, using the blue PEEK tubing as the sample loop, and with a mobile phase flow rate of 50 µL/min.
Figure 10B:
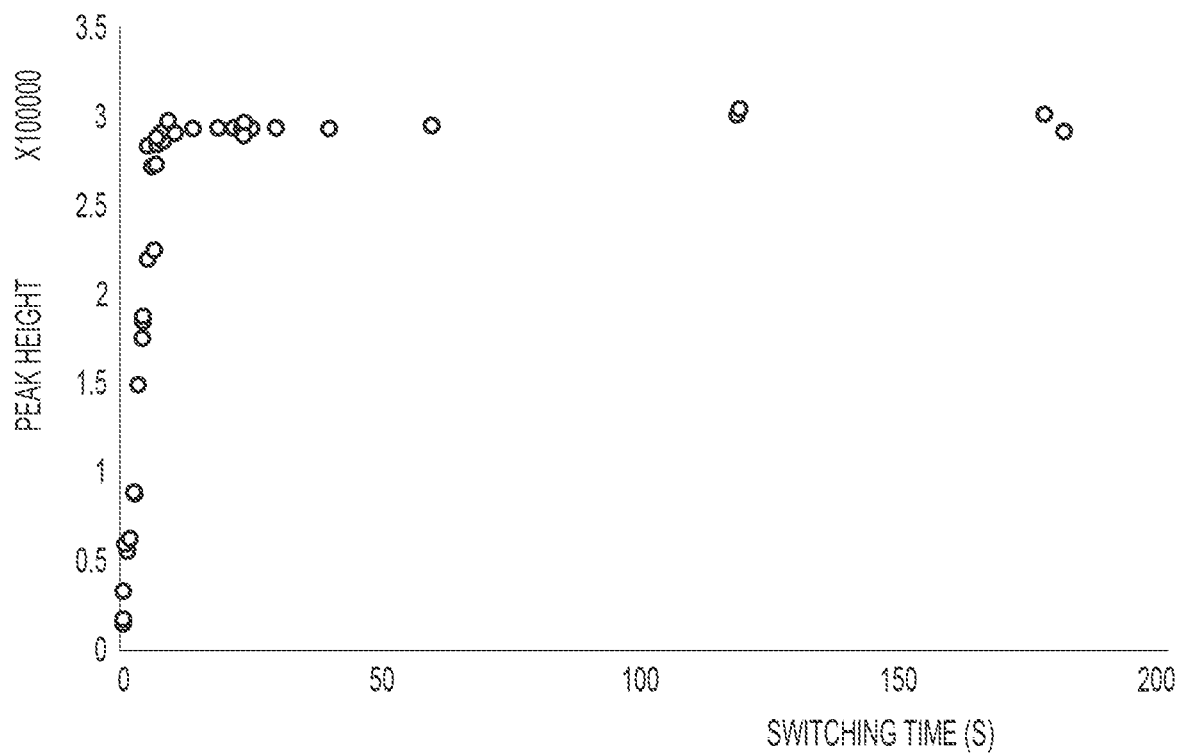
FIG. 10B is a plot of peak height for HPLC performed on the sample of 0.3% acetone in water (v/v), plotted as a function of the time of the injection mode, using the blue PEEK tubing as the sample loop, and with a mobile phase flow rate of 50 µL/min.

FIG. 9 shows the chromatogram of the acetone using the blue PEEK tubing at a mobile phase flow rate of 50 μL/min. As with the previous examples, the chromatogram shows the increase of the peak areas and heights as the injected volume increased, corresponding to the switching time of the sample loop. As the samples were injected with the full loop, the peaks reached the maximum and stable area and height. FIGS. 10A and 10B show the increase of the peak area and peak height, respectively, with the switching time of the blue sample loop. The plots show the area and height of the maximum and stable peaks as the switching time reached the limits of linearity time at each flow rate. This is supported by calculating the peak areas and heights after each cycle. The limits of linearity time of the blue PEEK loop corresponding to the maximum injection volume at different flow rates are given above in Table 1. Under different conditions of mobile phase flow rates and switching time, accurate volumes were successfully injected into the separation column varying from 0.508 μL to 6.730 μL. At a fixed switching time of the loop, the areas of the acetone peaks gradually decreased as the mobile phase flow rate increased, as shown in FIG. 5D. Further, the linear relationship between peak area and switching time with $R^2$ values ≥0.9847 over all mobile phase flow rates, shown in FIG. 6D, demonstrates the accuracy and precision of the injected volumes.

Example 4

Figure 11A:
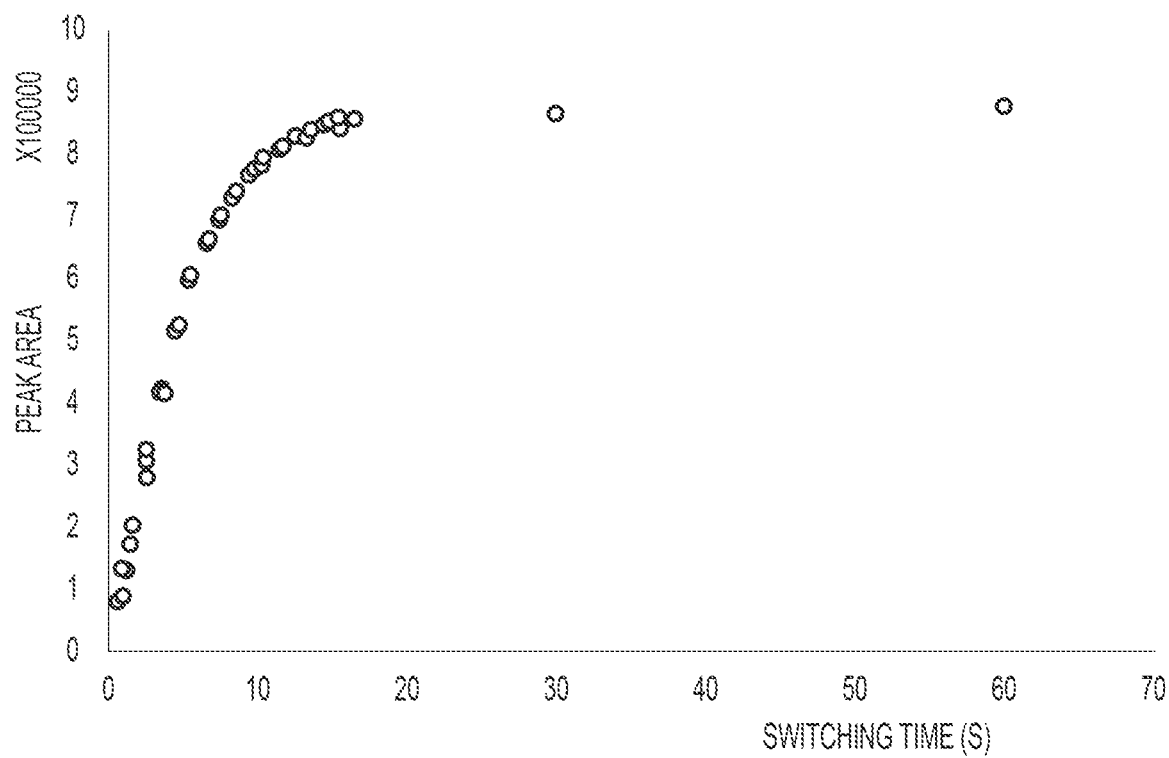
FIG. 11A is a plot of peak area for HPLC performed on the sample of 0.3% acetone in water (v/v), plotted as a function of the time of the injection mode, using the yellow PEEK tubing as the sample loop, and with a mobile phase flow rate of 10 L/min.
Figure 11B:
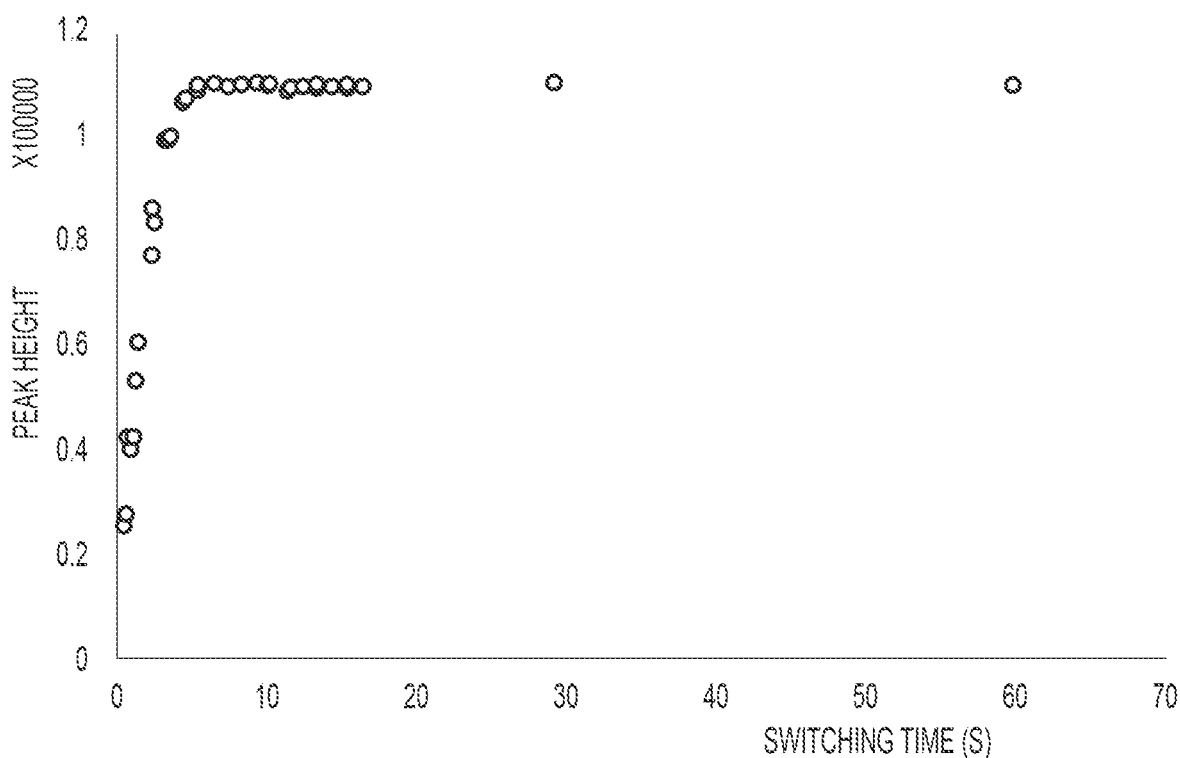
FIG. 11B is a plot of peak height for HPLC performed on the sample of 0.3% acetone in water (v/v), plotted as a function of the time of the injection mode, using the yellow PEEK tubing as the sample loop, and with a mobile phase flow rate of 10 µL/min.
Figure 12A:
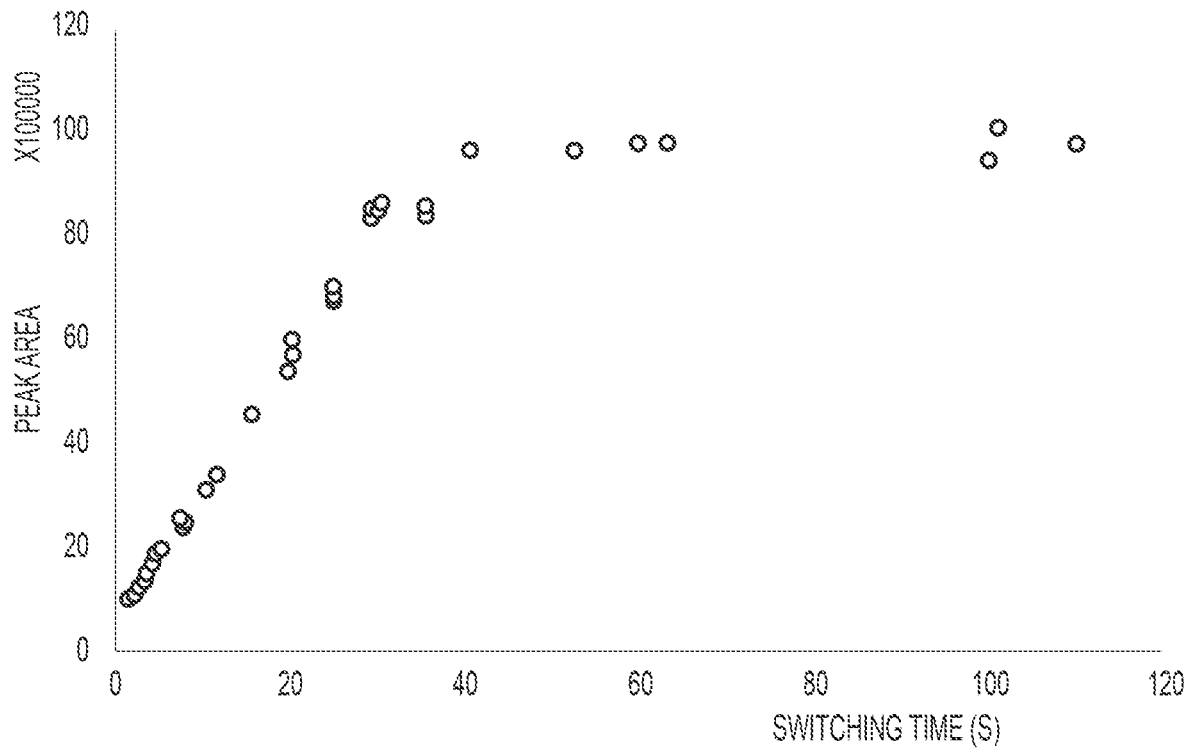
FIG. 12A is a plot of peak area for HPLC performed on the sample of 0.3% acetone in water (v/v), plotted as a function of the time of the injection mode, using the red PEEK tubing as the sample loop, and with a mobile phase flow rate of 2.0 µL/min.
Figure 12B:
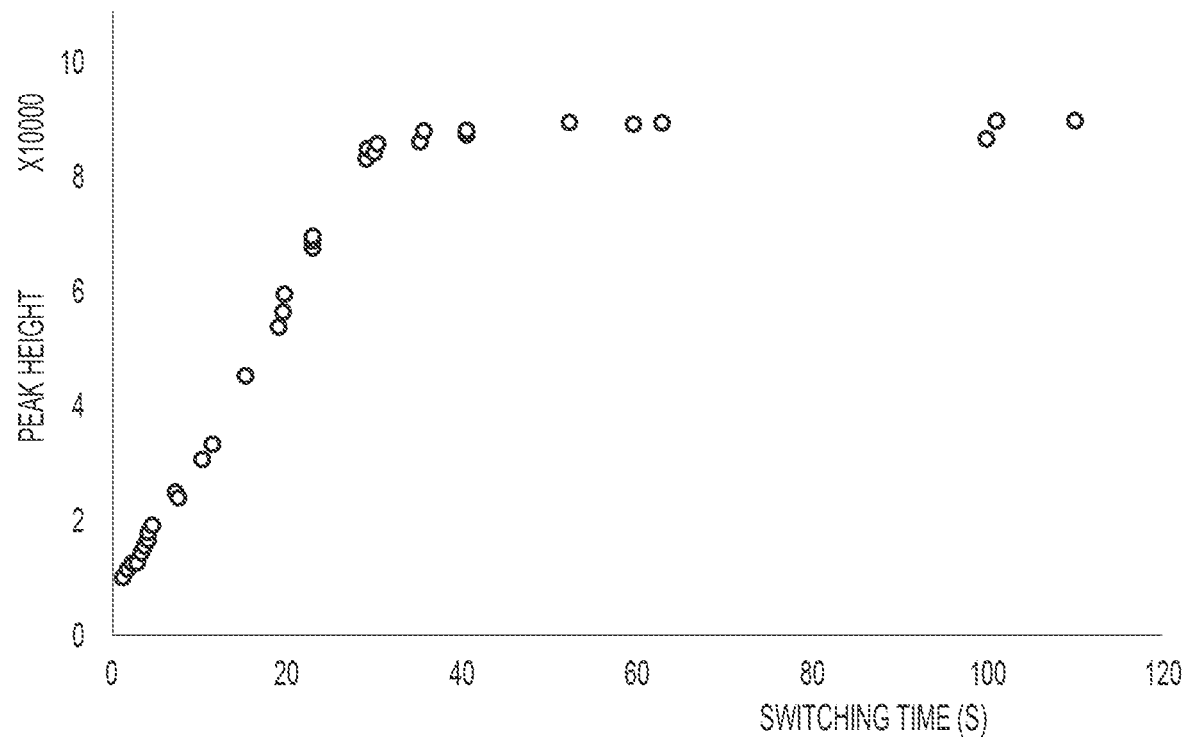
FIG. 12B is a plot of peak height for HPLC performed on the sample of 0.3% acetone in water (v/v), plotted as a function of the time of the injection mode, using the red PEEK tubing as the sample loop, and with a mobile phase flow rate of 2.0 µL/min.

Under the same conditions and parameters of Example 3, the experiments were repeated for the yellow PEEK sample loop (0.178 mm internal diameter, 11.8 cm long, and a 2.938 μL loop volume) and the red PEEK sample loop (0.127 mm internal diameter, 9.0 cm long, and a 1.143 μL loop volume). FIGS. 11A and 11B show the increase of the peak area and peak height with the switching time for the yellow sample loop, respectively, and FIGS. 12A and 12B show the increase of the peak area and peak height with the switching time for the red sample loop, respectively. The maximum areas and heights of the peaks were obtained by leaving the sample loop open at the limit of linearity time at each flow rate, which corresponds to the full loop injection. The limits of linearity time of the yellow and red sample loops at different mobile phase flow rates are given above in Table 1. Under different conditions of mobile phase flow rates and switching times, accurate volumes were successfully injected into the separation column varying from 0.140 μL to 2.938 μL using the yellow sample loop and 52 nL to 1.143 μL using the red sample loop.

Figures 5E, 5F:
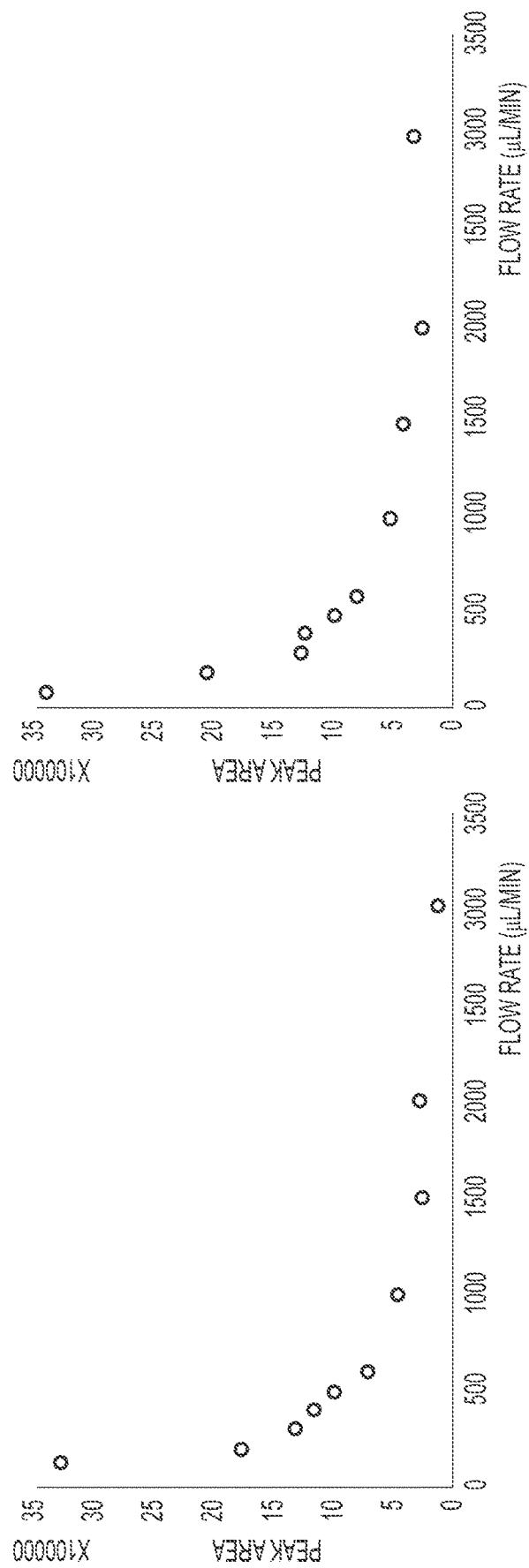
FIG. 5E is a plot of peak area as a function of mobile phase flow rate for HPLC performed on the sample of 0.015% acetone in water (v/v) using yellow PEEK tubing as the sample loop.
FIG. 5F is a plot of peak area as a function of mobile phase flow rate for HPLC performed on the sample of 0.015% acetone in water (v/v) using red PEEK tubing as the sample loop.
Figures 6A, 6B:
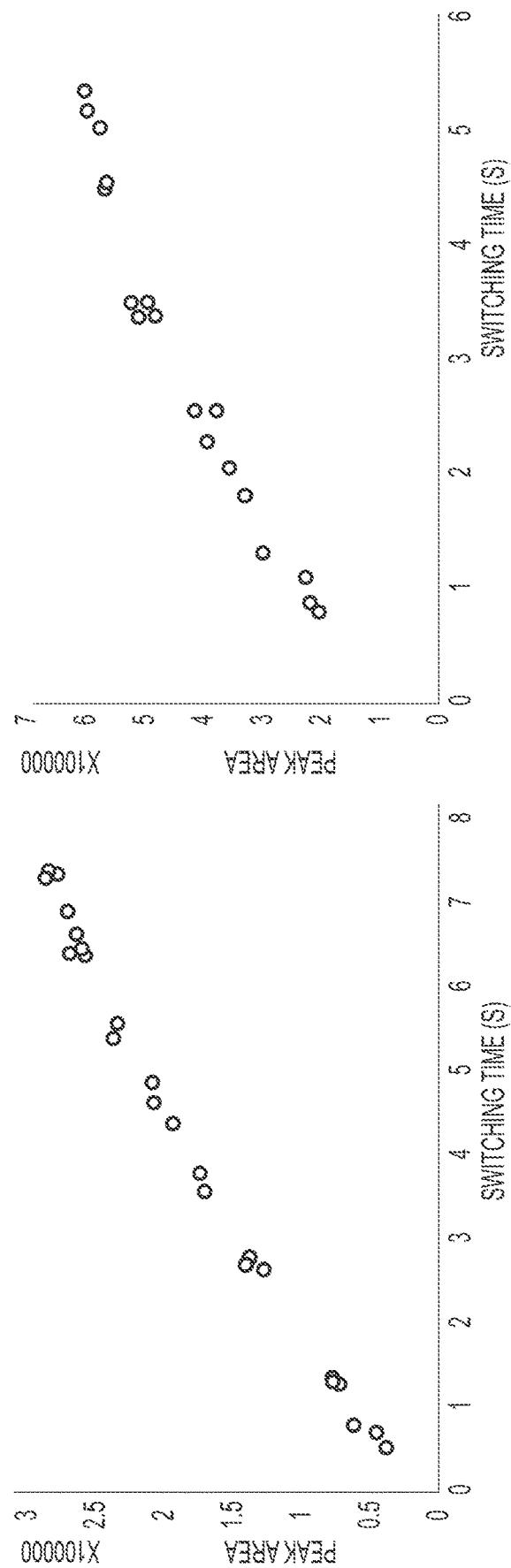
FIG. 6A is a plot of peak area as a function of time of the injection mode for HPLC performed on the sample of 0.015% acetone in water (v/v) using the gray PEEK tubing as the sample loop.
FIG. 6B is a plot of peak area as a function of time of the injection mode for HPLC performed on the sample of 0.015% acetone in water (v/v) using the green PEEK tubing as the sample loop.
Figures 6C, 6D:
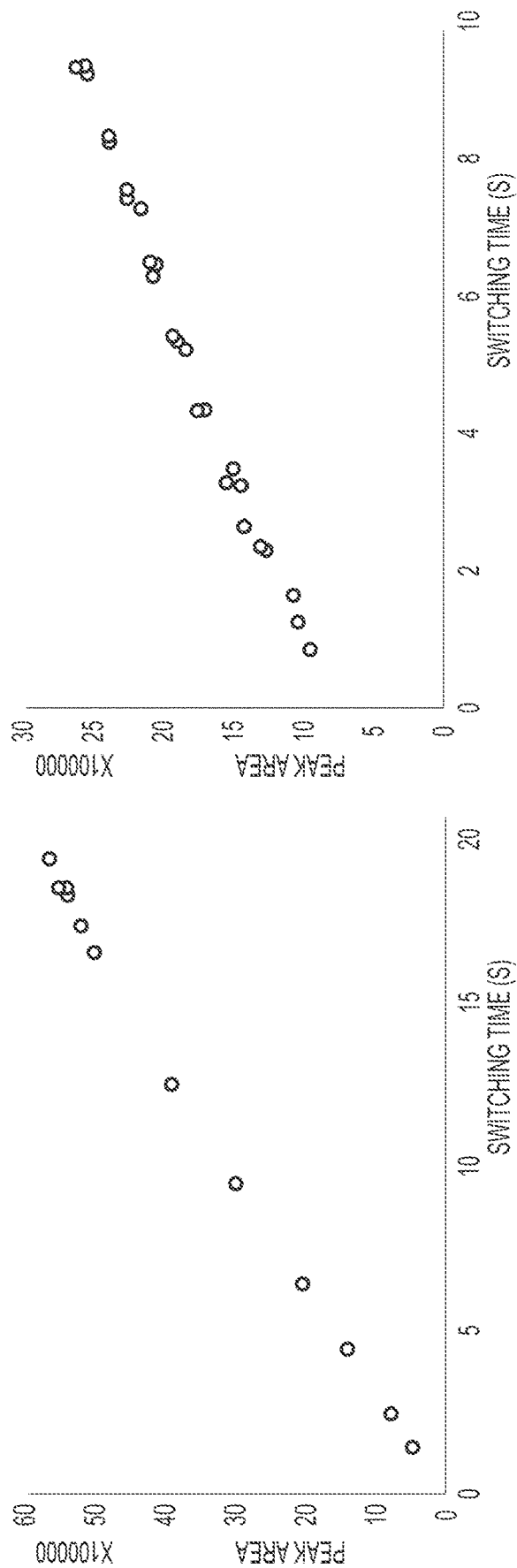
FIG. 6C is a plot of peak area as a function of time of the injection mode for HPLC performed on the sample of 0.015% acetone in water (v/v) using the orange PEEK tubing as the sample loop.
FIG. 6D is a plot of peak area as a function of time of the injection mode for HPLC performed on the sample of 0.015% acetone in water (v/v) using the blue PEEK tubing as the sample loop.
Figures 6E, 6F:
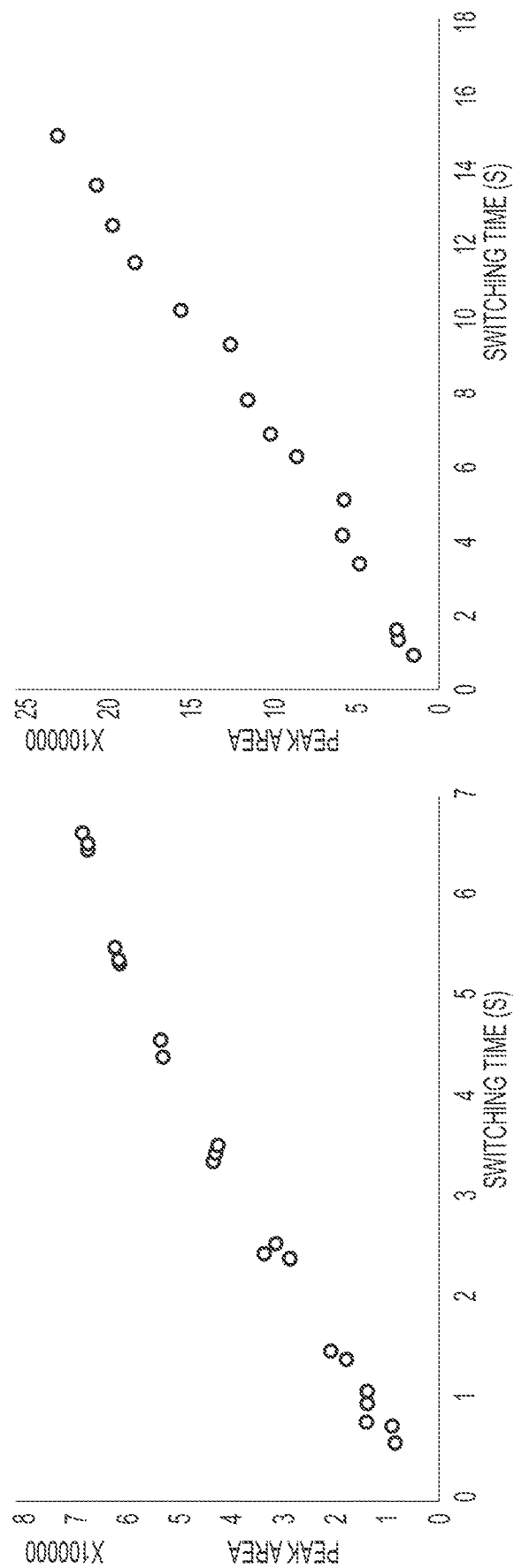
FIG. 6E is a plot of peak area as a function of time of the injection mode for HPLC performed on the sample of 0.015% acetone in water (v/v) using the yellow PEEK tubing as the sample loop.
FIG. 6F is a plot of peak area as a function of time of the injection mode for HPLC performed on the sample of 0.015% acetone in water (v/v) using red PEEK tubing as the sample loop.

At a specific switching time, peak areas gradually decreased as the flow rate increased, as shown in FIGS. 5E and 5F for the yellow and red PEEK loops, respectively. FIGS. 6E and 6F show the linear relationships between the peak area of the samples and switching times for the yellow and red PEEK loops, respectively. The values of $R^2$ were better than 0.9919 for both sample loops at all of the flow rates, confirming the accuracy and precision of the injected volumes.

Example 5

For the red PEEKsil™ sample loop (internal diameter of 0.100 mm), a fused silica capillary column with the same type of polymeric stationary phase used in the previous examples, but with a smaller internal diameter (50 μm) and the same length (20 cm), was prepared and connected to the same conventional HPLC system. The detection was performed using a micro-UV detector cell with a volume of 0.350 μL. A sample loop was prepared using the red PEEKsil™ tubing with an internal diameter of 0.100 mm and a length of 12.8 cm, resulting in a full loop volume of 1.005 μL. The sample loop was filled with a solution of acetone 0.5% in water (v/v) using a disposable manual syringe. The samples were eluted using a binary acetonitrile/water (50:50, v/v) composition at different flow rates ranging from 0.50 μL/min to 2.0 μL/min. The samples were detected at a 260 nm UV wavelength.

Figure 13:
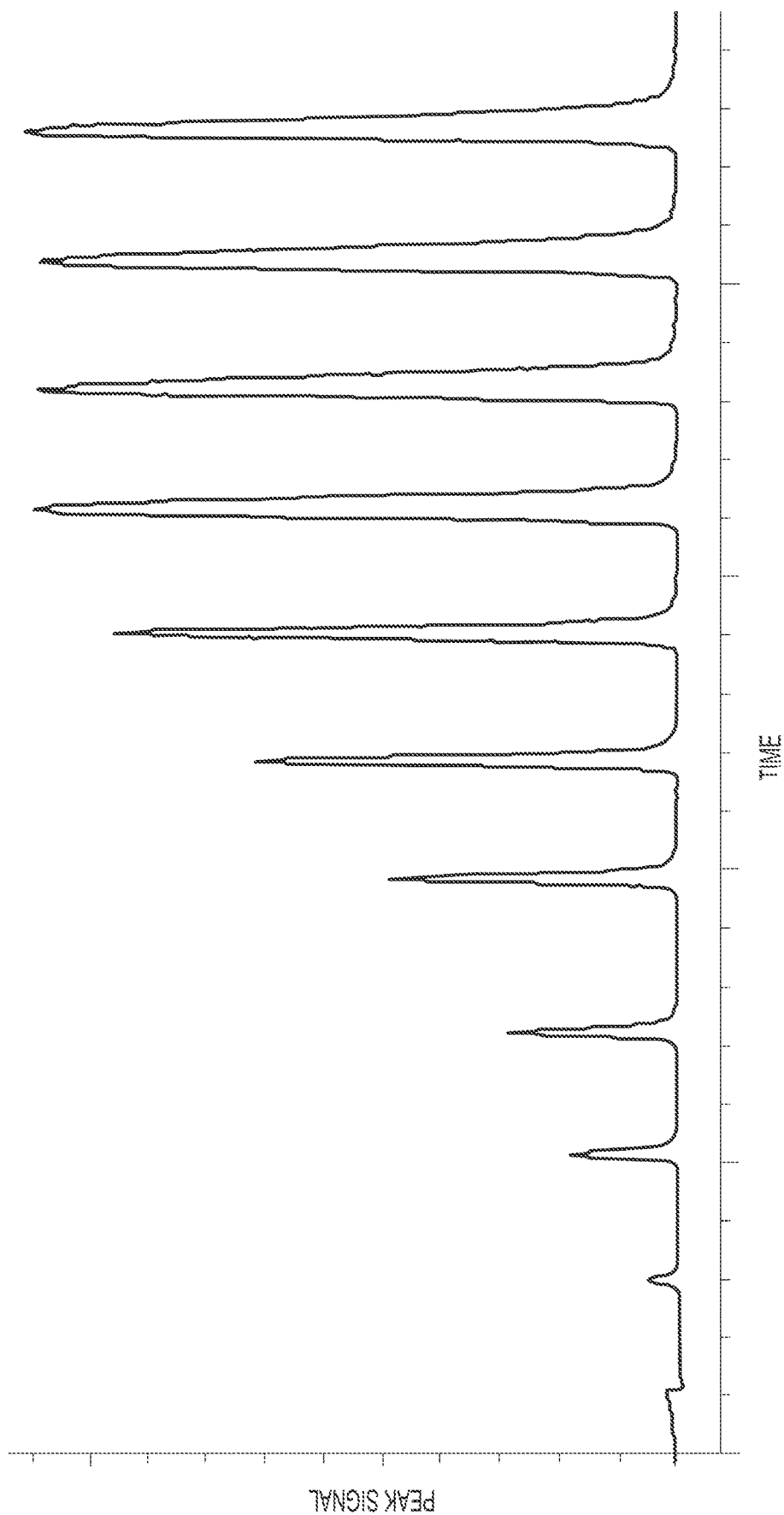
FIG. 13 is a chromatogram produced by HPLC on a sample of 0.5% acetone in water (v/v), showing peaks as a function of time of the injection mode, using red PEEKsil™ tubing as the sample loop, and with water as the mobile phase at a flow rate of 0.50 L/min.
Figure 14A:
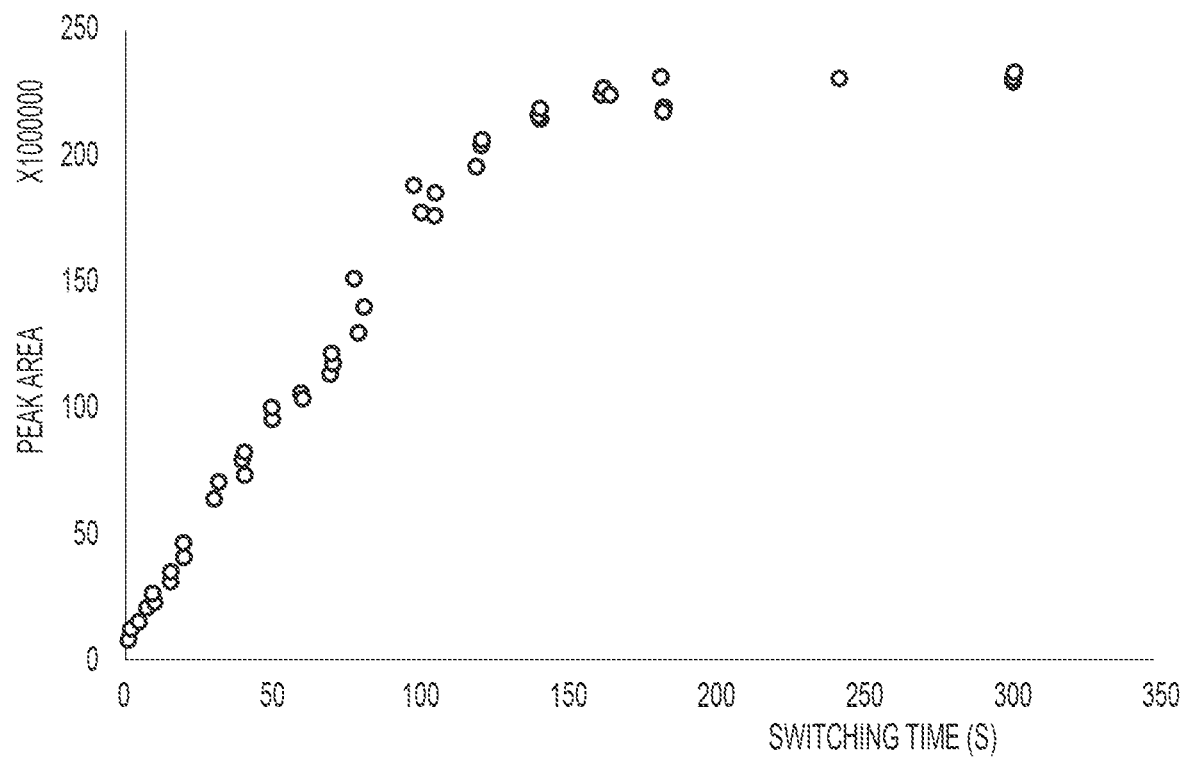
FIG. 14A is a plot of peak area for HPLC performed on the sample of 0.5% acetone in water (v/v), plotted as a function of the time of the injection mode, using the red PEEKsil™ PEEK tubing as the sample loop, and with a mobile phase flow rate of 0.50 µL/min.
Figure 14B:
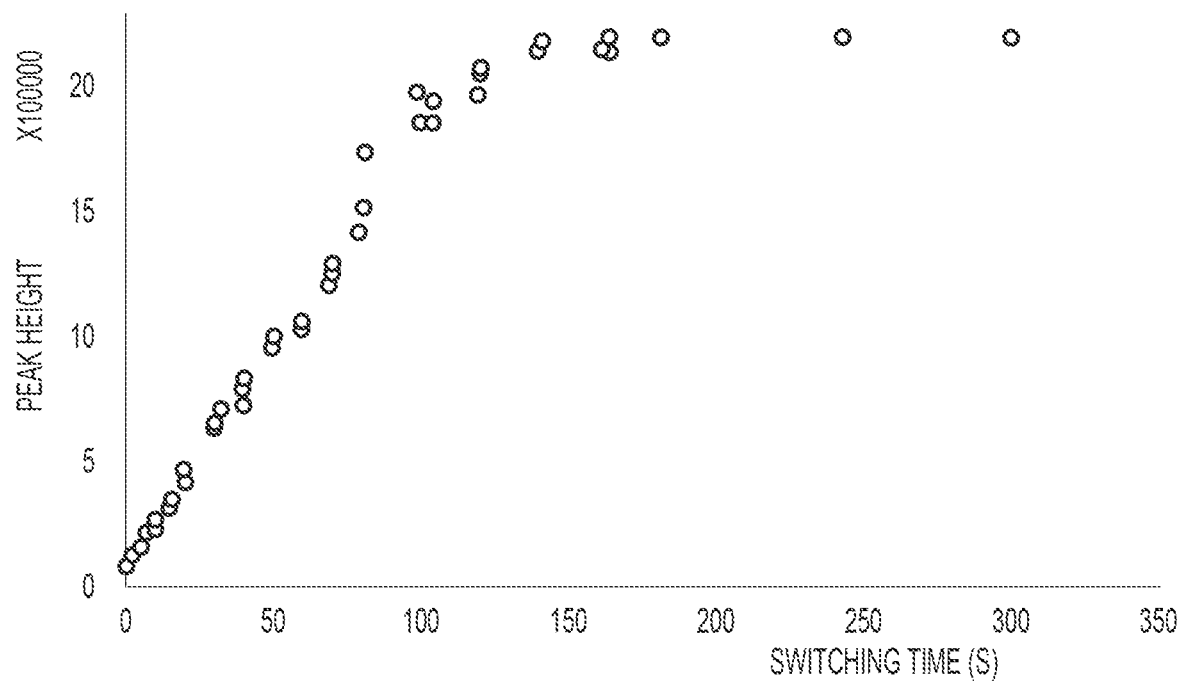
FIG. 14B is a plot of peak height for HPLC performed on the sample of 0.5% acetone in water (v/v), plotted as a function of the time of the injection mode, using the red PEEKsil™ PEEK tubing as the sample loop, and with a mobile phase flow rate of 0.50 µL/min.

FIG. 13 shows the chromatogram for the acetone using using the red PEEKsil™ sample loop at a flow rate of 0.50 L/min. The chromatogram shows the increase of the peak area and the peak height as the switching time of the sample loop increased, corresponding to the increase of the injection volume. FIGS. 14A and 14B show the increase of the peak area and peak height with the switching time of the sample loop at a constant flow rate, respectively. At the maximum injection volumes, or as the switching time reached the limit of linearity time, at a specific flow rate, the area and height of the maximum and stable peaks were obtained. The limits of linearity time of the red PEEKsil™ tubing corresponding to the maximum injection volume at the applied flow rates are given above in Table 1. By varying the conditions of the mobile phase flow rates and switching times, accurate and repeatable volumes were injected into the prepared column, ranging from 5.02 nL to 1.005 μL. Under all of the applied flow rates, the $R^2$ values were ≥0.9896, which demonstrates the linearity between the switching time, the injection volume, and the peak area of the injected samples.

It is to be understood that the method of metered switching for a high-performance liquid chromatography sample injector is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of metered switching for a high-performance liquid chromatography sample injector, comprising:
    in a load mode of a high-performance liquid chromatography sample injector, injecting a sample into the high-performance liquid chromatography sample injector until a sample loop thereof is filled with the sample, wherein the sample loop is not in fluid communication with an outlet port of the high-performance liquid chromatography sample injector in the load mode;
    switching the high-performance liquid chromatography sample injector into an injection mode wherein, in the injection mode, the sample loop is in fluid communication with a source of pressurized mobile phase and with the outlet port such that the pressurized mobile phase pushes the sample through the sample loop and out of the outlet port; and
    switching the high-performance liquid chromatography sample injector back into the load mode at a selected time corresponding to a desired volume of the sample to be dispensed from the outlet port, wherein a time-dependent correspondence between a flow rate of the pressurized mobile phase and the desired volume of the sample for the sample loop is known.

2. The method of metered switching for a high-performance liquid chromatography sample injector as recited in claim 1, wherein, in the load mode, the sample is injected into the high-performance liquid chromatography sample injector until a portion thereof is drained from a waste port in fluid communication with the sample loop.

* * * * *